United States Patent [19]
Kimura et al.

[11] Patent Number: 5,749,642
[45] Date of Patent: May 12, 1998

[54] ILLUMINATING OPTICAL SYSTEM AND PROJECTOR UTILIZING THE SAME

[75] Inventors: Kazumi Kimura, Atsugi; Hideaki Mitsutake, Tokyo; Kohtaro Yano, Yokohama; Shigeru Kawasaki, Isehara; Junko Kuramochi, Yokohama, all of Japan

[73] Assignee: Canon Kabushiki Kaisha, Tokyo, Japan

[21] Appl. No.: 819,408

[22] Filed: Mar. 17, 1997

Related U.S. Application Data

[60] Continuation of Ser. No. 461,557, Jun. 5, 1995, abandoned, which is a division of Ser. No. 453,441, May 30, 1995, which is a division of Ser. No. 30,571, Mar. 12, 1993, abandoned.

[30] Foreign Application Priority Data

Mar. 18, 1992 [JP] Japan ................................. 4-62293

[51] Int. Cl.$^6$ ................................... G03B 21/28
[52] U.S. Cl. ................................... 353/98; 362/296
[58] Field of Search ................... 353/98, 99, 97, 353/34, 37, 102; 362/296, 297, 298, 301, 302, 346, 349, 341

[56] References Cited

U.S. PATENT DOCUMENTS

| | | |
|---|---|---|
| 1,223,752 | 4/1917 | Adams . |
| 1,503,766 | 8/1924 | Pictet et al. . |
| 1,717,360 | 6/1929 | Anderson et al. . |
| 2,272,186 | 2/1942 | Creehan . |
| 2,887,566 | 5/1959 | Marks . |
| 3,508,809 | 4/1970 | Wilder et al. . |
| 3,566,099 | 2/1971 | Makas et al. . |
| 3,588,493 | 6/1971 | Nordquist . |
| 4,320,442 | 3/1982 | McCamy ................ 362/302 |
| 4,334,734 | 6/1982 | Hareng et al. . |
| 4,525,413 | 6/1985 | Rogers et al. . |
| 4,560,999 | 12/1985 | Tokuhara . |
| 4,657,397 | 4/1987 | Oehler et al. . |
| 4,660,936 | 4/1987 | Nosker . |
| 4,864,390 | 9/1989 | McKehnie et al. . |
| 4,936,659 | 6/1990 | Anderson et al. . |
| 4,973,139 | 11/1990 | Weinhrauch et al. . |
| 4,989,076 | 1/1991 | Owada et al. . |
| 5,042,921 | 8/1991 | Sato et al. . |

(List continued on next page.)

FOREIGN PATENT DOCUMENTS

| | | |
|---|---|---|
| 322070 | 6/1989 | European Pat. Off. . |
| 0456427A2 | 5/1991 | European Pat. Off. . |
| 711306 | 9/1931 | France . |
| 1058232 | 3/1954 | France . |
| 2007195 | 1/1970 | France . |
| 554927 | 11/1929 | Germany . |
| 58-066909 | 4/1983 | Japan . |
| 59-165037 | 9/1984 | Japan . |
| 4005643 | 1/1992 | Japan . |
| 690467 | 4/1953 | United Kingdom . |
| 2016735 | 9/1979 | United Kingdom . |
| 2097997 | 11/1992 | United Kingdom . |
| WO8400217 | 6/1993 | WIPO . |

*Primary Examiner*—William Dowling
*Attorney, Agent, or Firm*—Morgan & Finnegan LLP

[57] ABSTRACT

This invention provides a projector capable of effectively utilizing the light from the light source and significantly reducing the light illuminating the outside of the area to be illuminated, thereby attaining an excellent efficiency of light utilization. In the illuminating system of the present invention provided with a light source and a reflector, there is further provided a circular reflector of a spherical surface, for returning the light, which emerges from the light source to the outside of the area to be illuminated, without being reflected on the reflector, to the light source. Also there is provided a flat mirror or a substantially spherical sub reflector for returning the light, which proceeds to the outside of the area to be illuminated, after being reflected on the reflector, to the light source. The sub reflector may be provided in the vicinity of the light source.

7 Claims, 15 Drawing Sheets

U.S. PATENT DOCUMENTS

| | | |
|---|---|---|
| 5,097,323 | 3/1992 | Sato et al. . |
| 5,122,895 | 6/1992 | Takanashi et al. . |
| 5,123,729 | 6/1992 | Kondo et al. . |
| 5,142,387 | 8/1992 | Shikara et al. ............... 362/298 |
| 5,146,248 | 9/1992 | Duwaer ........................ 353/98 |
| 5,164,854 | 11/1992 | Takanashi et al. . |
| 5,192,962 | 3/1993 | Nishida et al. ............... 353/98 |
| 5,217,299 | 6/1993 | Yoshida et al. ............... 362/298 |
| 5,414,600 | 5/1995 | Strobl et al. ................. 362/298 |
| 5,461,500 | 10/1995 | Tsuji et al. . |
| 5,491,525 | 2/1996 | Yamasaki et al. ............. 353/98 |

ILLUMINATING OPTICAL SYSTEM AND PROJECTOR UTILIZING THE SAME

This is a continuation of application Ser. No. 08/461,557 filed Jun. 5, 1995, now abandoned which is a divisional of pending application Ser. No. 08/453,441 filed on May 30, 1995; now allowed, which is a division of application Ser. No. 08/030,571 filed Mar. 12, 1993, now abandoned.

BACKGROUND OF THE INVENTION

Field of the Invention

The present invention relates to an illuminating optical system and a projector utilizing the same.

Related Background Art

In the conventional illuminating optical system, a reflector is provided around a light source lamp in order to make the light three-dimensionally spreading from said lamp direct toward a certain direction.

There are already known elliptical and parabolic reflectors, and a rotationally symmetrical reflector with respect to the optical axis is employed in case the light source lamp constitutes a point light source, while a tubular reflector is employed in case the light source lamp is pole-shaped.

In an illuminating optical system employing an elliptical reflector for obtaining a substantially parallel light beam, as shown in FIG. 1, a point light source lamp 501 is positioned on a first focal point $O_5$ lying farther from the object to be illuminated (not shown), among two focal points $O_5$, $O'_5$ of an elliptical reflector 500 rotationally symmetrical to the optical axis P, and a concave lens 502 having its focal point on the second focal point $O'_5$ is positioned on the optical path of the emerging light, in order to convert said emerging light into a parallel light beam.

In such illuminating optical system, the light emitted from the lamp 501 and reflected by the elliptical reflector 500 converges toward said second focal point $O'_5$. Said converged light enters the concave lens 502, thus converted into a parallel light beam and emerges as the illuminating light toward the object to be illuminated. Said concave lens 502 is dispensed with in case the elliptical reflector is replaced by a parabolic reflector, because the light emerging therefrom is already substantially parallel light beam.

In the following there will be explained a projector employing a conventional illuminating optical system, with reference to FIG. 2.

Said projector is provided with an illuminating optical system providing a parabolic reflector 902 around a light source lamp 901, and a rectangular liquid crystal display device 903 constituting image forming means, wherein the light of the light source emitted by the lamp 901 is reflected by the parabolic reflector 902 to illuminate toward the liquid crystal device 903.

The illuminating light emerging from the illuminating optical system equipped with the above-mentioned parabolic reflector 902 becomes a light beam having a circular cross section (illuminated area 904) capable of sufficiently illuminating the liquid crystal device 903. When the liquid crystal device 903 is illuminated by the light beam of circular cross section, the hatched part of the illuminating area 904 is used for not illuminating the liquid crystal device 903 because the device 903 is rectangular.

In case the cross sectional shape of the illuminating light beam emerging from the illuminating optical system is different from the shape of the object to be illuminated, such as the image forming means, among said illuminating light beams, light beams not illuminating said object arises to bring about undesirable effects such as ghost and flare. For this reason there has been employed a diaphragm or the like to match the shape of the illuminating light beam with that of the object to be illuminated, or the interior color of the apparatus makes black in order to absorb unnecessary light.

However, in the conventional illuminating optical system shown in FIG. 1, the emerging light without being reflected by the elliptical reflector does not converge on the second focal point $O'_5$, and is not utilized for illumination, whereby the rate of light utilization is lowered.

Also in case such illuminating optical system is applied to a projector, such portion of light not utilized for illumination gives rise to ghost and flare, or the like to thereby hinder clear image display.

Also in the conventional projector shown in FIG. 2, the portion of light not reaching the object, namely the portion of light illuminating on the diaphragm or absorbed by the internal wall of the apparatus is lost, to deteriorate the rate of light utilization. Besides such absorbed light is converted into heat, which necessitates cooling means, to bring about the larger size and higher cost of the apparatus.

SUMMARY OF THE INVENTION

In consideration of the foregoing problems, the object of the present invention is to provide a projector utilizing a compact illuminating optical system and an illuminating optical one capable of bringing about a high efficiency of light utilization and attaining high luminance in the projected image.

According to an aspect of the present invention, there is provided an illuminating optical system in which a light source lamp is positioned on a first focal point lying farther from the object to be illuminated, among two focal points of an elliptical reflector, wherein a circular reflector, having an arc-shaped cross section of a radius equal in length to the distance between said two focal points, is positioned in opposed relationship to said elliptical reflector in such a manner that the center of said circular reflector coincides with the other second focal point among said two focal points, and an aperture is formed at the center of said circular reflector.

According to another aspect of the present invention, there is provided an illuminating optical system having a light source at the focal point of a parabolic reflector, wherein a flat mirror for reflecting the emergent light, having an aperture substantially same as the shape of the illuminated area, is provided on the optical path of the light emerging after reflection by said parabolic reflector, perpendicularly to the optical axis of said emerging light.

According to another aspect of the present invention, there is provided an illuminating optical system providing a light source on at least one of two focal points of an elliptical reflector and also providing an optical element for converting the light emerging after reflection by said elliptical reflector into a parallel light beam, wherein a flat mirror for reflecting the emerging light, having an aperture substantially same as the shape of the illuminated area, is arranged on the optical path of thus converted parallel emerging light, perpendicularly to the optical axis of said emerging light.

According to another aspect of the present invention, there is provided an illuminating optical system provided with a light source, a reflector having the central position at the back of said light source and also having an aperture larger than the area to be illuminated, and a sub-reflector

3 directing the light, which is emitted from said light source and proceeds to the outside of said illuminated area by way of said reflector, toward said light source in front of said reflector.

DETAILED DESCRIPTION OF THE PREFERRED EMBODIMENTS

Now the present invention will be clarified in detail by preferred embodiments thereof shown in the attached drawings.

Figure 1:
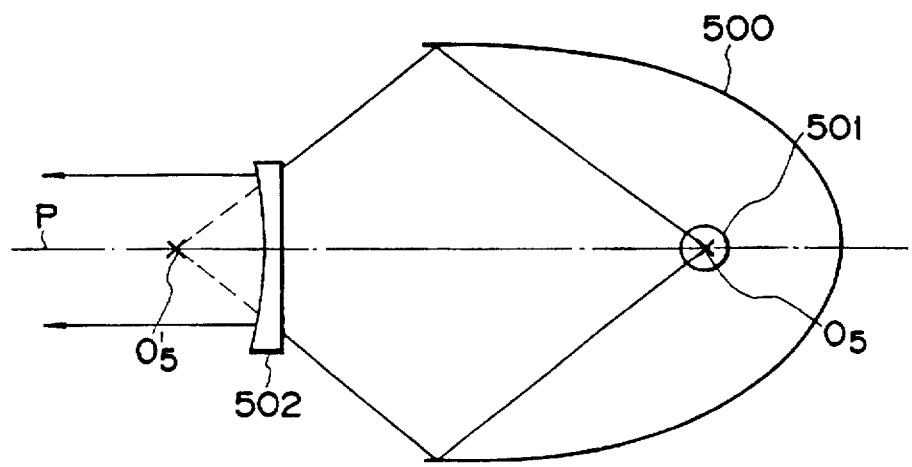
FIG. 1 is a cross-sectional view of a conventional illuminating optical system.
Figure 2:
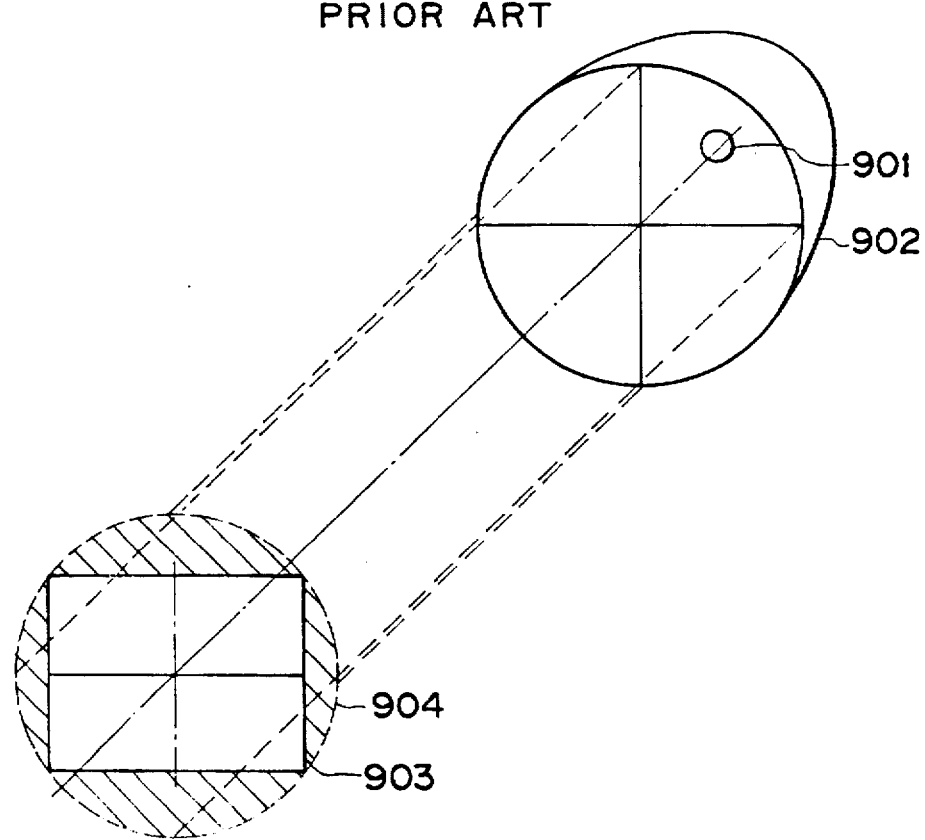
FIG. 2 is a perspective view of a projector employing a conventional illuminating optical system.
Figure 3:
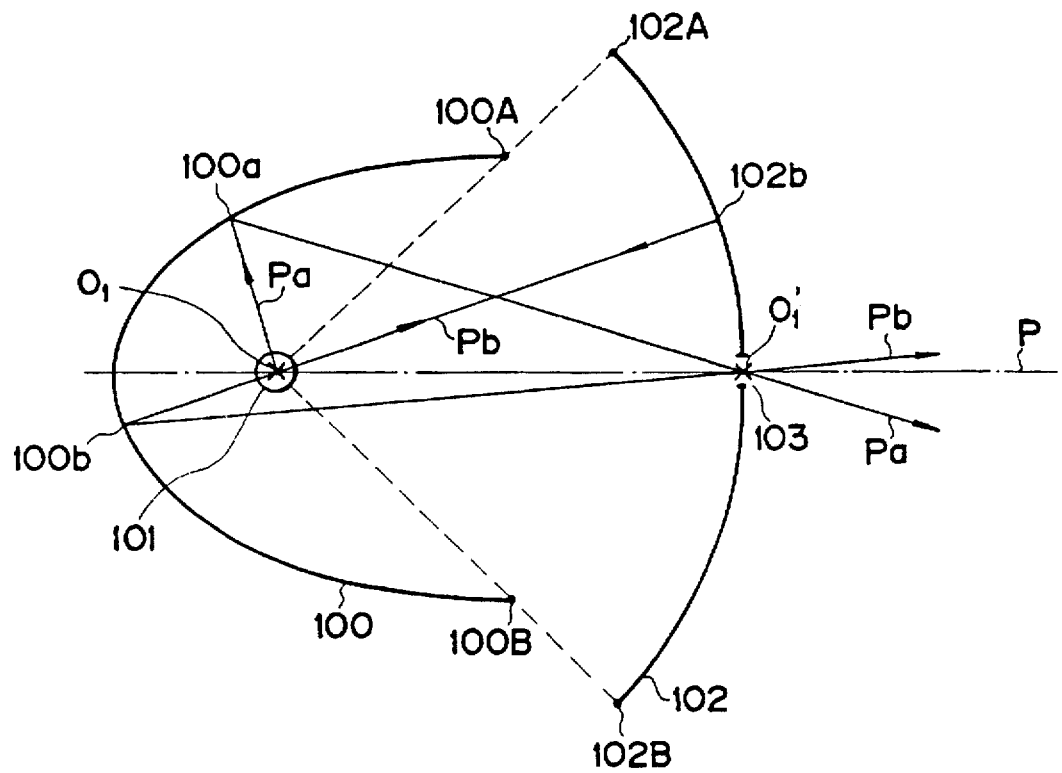
FIG. 3 is a cross-sectional view of an embodiment of the illuminating optical system of the present invention.

FIG. 3 is a cross-sectional view showing an embodiment of the illuminating optical system of the present invention.

The illuminating optical system of the present embodiment is provided with an elliptical reflector 100 rotationally symmetrical with respect to an optical axis P, a point light

4 source lamp 101 positioned on a first focal point $O_1$ lying farther from the unrepresented object to be illuminated, of two focal points $O_1$, $O'_1$ of said reflector 100, and a circular reflector 102 positioned on the emerging optical path.

Said circular reflector 102 has a reflecting face consisting of a part of a spherical surface of which radius is substantially equal to the distance between said two focal points $O_1$, $O'_1$, and an aperture 103 is formed at the center of said reflecting face.

Said circular reflector 102 is so positioned as to be symmetrical with respect to the optical axis P, with said aperture 103 coinciding with the second focal point $O'_1$ of said elliptical reflector 100.

Also said circular reflector 102 is so dimensioned that, when it is positioned on the optical axis P as mentioned above, the angle from said first focal point $O_1$ to edges 102A, 102B (edge positions symmetrical with respect to the optical axis P) is substantially same as that from said first focal point $O_1$ to edges 100A, 100B (similarly symmetrical to the optical axis P) of the elliptical reflector 100.

In the following there will be explained the emerging optical path of the illuminating optical system of the present embodiment.

At first, the light Pa emitted from the lamp 101 and reflected on a point 100a of the elliptical reflector 100 passes the second focal point $O'_1$, and emerges therefore through the aperture 103 of the circular reflector 102.

Thus the light emitted from the lamp 101 and reflected by the elliptical reflector 100 is mostly condensed in the vicinity of the second focal point $O'_1$, thus being emitted through the aperture 103 of the circular reflector 102, because the lamp 101 is positioned on said first focal point $O_1$.

On the other hand, the light beam Pb emitted from the lamp 101 and directly emerging without reflecting by the elliptical reflector 100 is reflected on a point 102b of the circular reflector 102 and returns to the lamp 101. This is because the circular reflector 102 is composed of a part of a spherical face of which radius is equal to the distance between the first and second focal points $O_1$, $O'_2$, and all the light proceeding directly to the circular reflector 102 returns to the lamp 101. The light beam Pb returning to the lamp 101 is transmitted thereby is reflected on a point 100b of the elliptical reflector 100 in the same manner as the light Pa, thus being condensed on the second focal point $O'_1$, and emerges through the aperture 103.

The directly emerging light, such as the light beam Pb, has not been utilized for illumination in the conventional configuration, but is made usable for illumination in the present embodiment, by the reflection on the circular reflector 102. As the circular reflector 102 of the present embodiment is so dimensioned that the angle from the first focal point $O_1$ to the edges 102A, 102B is same as that from said first focal point $O_1$ to the edges 100A, 100B of the elliptical reflector 100, the light emitted from the lamp 101 to the edge of the elliptical reflector 100 can also be reflected by the circular reflector 102.

However, since the lamp 101 in fact has a finite size, the light is emitted from positions other than the first focal point $O_1$. For this reason, the angle formed with a side from $O_1$ to 102A and one from $O_1$ to 102B by the circular reflector 102 is preferably larger than the angle done with a side from $O_1$ to 100A and one from $O_1$ to 100B. Also in the present embodiment, the circular reflector 102 is so positioned that the aperture 103 thereof coincides with said second focal point $O'_1$, whereby said aperture 103 can be made smaller and the light reflected by the elliptical reflector 100 and a condensed light beam on said second focal point $O'_1$ alone can emerge as a light beam diverging within a certain angular range around the optical axis P.

If the object to be illuminated requires highly collimated illuminating light, such as a liquid crystal element, the emerging light from said aperture 103 can be collimated by an optical element such as a convex lens or the like.

In the following there will be explained another embodiment of the illuminating optical system of the present invention, with reference to FIG. 4, which is a cross-sectional view of said embodiment.

In this embodiment, a circular reflector 202 is mounted in contact with an elliptical reflector 200.

Also in this embodiment, a light source lamp 201 is positioned on a first focal point $O_2$ lying farther from an unshown object, among two focal points $O_2$, $O'_2$ of an elliptical reflector 200 rotationally symmetrical to the optical axis P.

The circular reflector 202 is provided, as in the embodiment shown in FIG. 3, of a reflecting face composed of a part of a spherical surface of which radius is equal to the distance between said two focal points $O_2$ and $O'_2$, and has an aperture 203 at the central position. The circular reflector 202 is so dimensioned that, when it is arranged symmetrically to the optical axis P with the aperture 203 thereof on said second focal point $O'_2$, the edge thereof coincides with the edge of said elliptical reflector 202.

Also in the above-mentioned illuminating optical system, the light emitted from the lamp 201 is divided into a light beam Pc thereafter reflected by the elliptical reflector 200 and a light beam Pd proceeding directly toward the circular reflector 202, without being reflected by said elliptical reflector 200.

The light beam Pc is reflected on a point 200c of the elliptical reflector 200, then condensed on said second focal point $O'_2$ and emerges through the aperture 203 of the circular reflector 202.

On the other hand, the light beam Pd is reflected on a point 202d of the circular reflector 202, thus returns to and is transmitted by the lamp 201, then reflected on a point 200d of the elliptical reflector 200, condenses on the second focal point $O'_2$ and emerges through the apertures 203 in the same manner as the aforementioned light beam Pc.

In this embodiment, since the circular reflector 202 contacts with the elliptical reflector 200, the light beam can only emerge from the aperture 203. On the other hand, since the interior of the elliptical reflector 200 in the present embodiment is nearly sealed, there may result temperature increase therein and heat radiation should be improved for example by replacing the elliptical and circular reflectors for example by cold mirrors.

In the following there will be explained an embodiment of the projector of the present invention, with reference to FIG. 5.

In the projector of said embodiment, the illuminating light emitted from an illuminating optical system 300 is converted into a parallel light beam by a convex lens 405 for irradiating a liquid crystal device 307 constituting image forming means, and an image bearing light emerging therefrom is projected, through a projection lens 309, onto a screen (not shown).

The illuminating optical system 300 of the present embodiment is provided, as in the system shown in FIG. 3, with a light source lamp 301 positioned on a first focal point $O_3$ lying farther from the liquid crystal device 307 constituting the illuminated object, among two focal points $O_3$, $O'_3$ of an elliptical reflector 302 which is rotationally symmetrical to the optical axis P, and a circular reflector 102 is provided on the emerging optical path.

The circular reflector 102 is provided with a reflecting face consisting of a part of a spherical surface of which radius is same as the distance between said two focal points, and has an aperture 304 at the central position. Said circular reflector 102 is positioned symmetrically to the optical axis P, in such a manner that the aperture 304 coincides with the second focal point $O'_3$. Also the circular reflector 102 is so dimensioned that, when it is positioned on the optical axis P as mentioned above, the angle formed by two sides from the first focal point $O_3$ to the edges 102A and 102B (edge positions symmetrical to the optical axis P) of the circular reflector 102, is same as that of the edges 302A, 302B (similarly symmetrical to the optical axis P) of the elliptical reflector 302, seen from said first focal point $O_3$.

The liquid crystal device 307 modulates the illuminating light on each pixel, according to image information. At the entrance and exit sides of said liquid crystal device 307, there are respectively provided a polarizing plate 306 serving as a polarizer and a polarizing plate 308 serving as an analyzer. Said polarizing plate 306 serving as the polarizer extracts one of two linearly polarized light components contained in the illuminating natural light. The polarizing plate 308 serving as the analyzer obtains the image light beam, according to either existence or non-existence the modulation in the polarizing direction, from the emerging light beam of the liquid crystal device 307.

In the illuminating optical system 300 of the above-explained configuration, the light from the lamp 301 emerges through the aperture 304 of the circular reflector 102, after first reflection by the elliptical reflector 302 or second reflections by the circular reflector 102 and the elliptical reflector 302. Said emerging light is emitted as diverging light diverged within a certain angular range around the optical axis P, and is converted into a parallel light beam through a convex lens 405, for illuminating the liquid crystal device 307. Said illuminating light at first passes the polarizing plate 306, whereby one of two linearly polarized light components contained in said parallel light beam is taken out for illuminating onto said liquid crystal device 307.

Upon irradiation onto the liquid crystal device 307 with the illuminating light, there emerge, from said device 307, light modulated and non-modulated light according to the image signal. The lights emerging from said device 307 enters the polarizing plate 308, which transmits, out of said modulated and non-modulated lights, the one representing the image. The image light, transmitted by said polarizing plate 308, is projected through the projection lens 309 onto an unshown screen.

The present embodiment employs the convex lens 405 for converting the diverging light beam from the illuminating optical system 300 into the parallel (collimated) light beam. However, in general, the rate of light utilization can be improved by the use of Köhler illumination focused on the pupil of the projection lens 309, and the power of the convex lens 405 may be so regulated as to achieve such illuminating state. Also said convex lens may be replaced by a Fresnel lens having a similar power.

Figure 4:
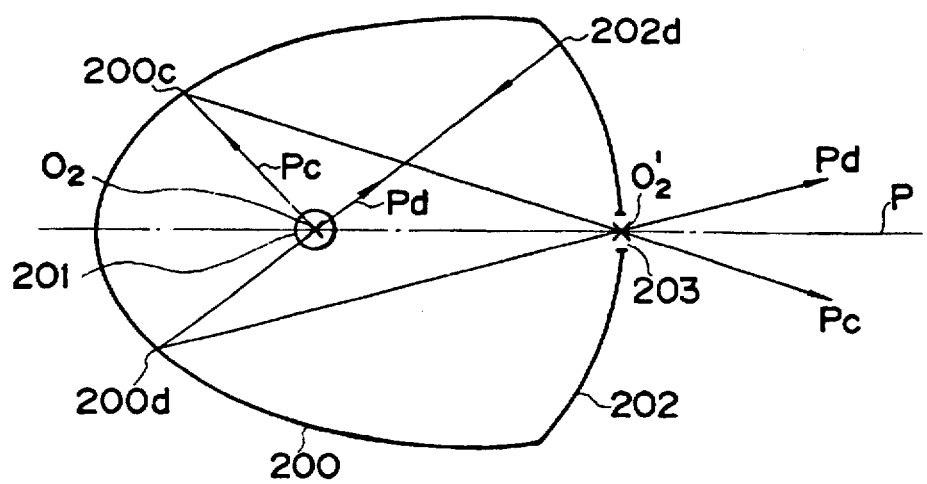
FIG. 4 is a cross-sectional view of another embodiment of the illuminating optical system of the present invention.

Also the illuminating optical system 300 may naturally be constructed as shown in FIG. 4.

In the foregoing there has been explained a monochromatic or color image display apparatus equipped with a liquid crystal device as image forming means, but the same concept is applicable also to a color image display apparatus equipped with three liquid crystal devices for forming images of red, green and blue respectively.

Such color image projector will be explained in the following, with reference to FIG. 6.

In the present embodiment, white diverging light, emitted from an illuminating optical system 400 similar to that shown in FIG. 3, is converted into a parallel light beam by a convex lens 405, further converted into polarized light of an aligned polarizing direction by a polarizing converter module 406, and the polarized light thus obtained is separated into red (R), green (G) and blue (B) lights by means of first and second dichroic mirrors 407, 408, a λ/2 plate 409 and a totally reflecting mirror 410. Thus obtained R, G and B lights respectively irradiate first to third liquid crystal devices (LCD's) 411, 412, 413, and image lights transmitted by said LCD's are synthesized by means of a third dichroic mirror 416 and a polarizing beam splitters 414, 415. The synthesized light is projected through a projection lens 417 onto an unshown screen.

As in the embodiment shown in FIG. 3, the illuminating optical system 400 is provided with a light source lamp 401 on a first focal point $O_4$ of an elliptical reflector 402 which is rotationally symmetrical to the optical axis. On the emerging optical path, there is provided a circular reflector 102, having a reflecting face consisting of a part of a spherical surface of which radius is same as the distance between the first and second focal points $O_4$, $O'_4$ of said elliptical reflector and having an aperture 404 at the central position of the reflecting face. Said circular reflector is positioned symmetrically to the optical axis, with the aperture 404 positioned on said second focal point $O'_4$.

As the light emerging through the aperture 404 of the circular reflector 102 of the illuminating optical system 400 diverges within a certain angular range, the convex lens 405 is provided for converting said diverging light into a parallel light beam for illuminating said liquid crystal devices 411, 412, 413.

The polarizing converter module 406 may be equivalent to the module disclosed in Japanese Patent Application Laid-open No. 61-90584 or No. 63-197913, and is so designed, in the present embodiment, that the polarizing plane of the emerging light provides so as to direct the P-polarized light to the first dichroic mirror 407.

The LCD's 411, 412, 413 are of a same transparent type of a same shape, for respectively forming red, green and blue images, and serve to modulate the illuminating light for each pixel, by primary color image signals respectively corresponding to said images. Said modulation is achieved, for example, by rotating the polarizing plane of the emerging light by 90° with respect to that of the incident light.

The first dichroic mirror 407 transmits the G and B lights but reflects the R light, while the second dichroic mirror 408 transmits the B light but reflects the R and G lights, and the third dichroic mirror 416 transmits the R and G lights but reflects the B light.

In the following explained is the function of the present embodiment.

The illuminating optical system 400 emits a light diverging within a certain angular range, which is converted into a parallel light beam by the convex lens 405. Said parallel light beam is converted, by the polarizing converter module 406, into P-polarized light $P_W$, which is incident, by the first dichroic mirror 407, onto a reflected R component $P_R$ and transmitted G and B components $(P_G+P_B)$. The R-component $P_R$ reflected by said first dichroic mirror 407 enters the λ/2-plate 409, while the transmitted components $(P_G+P_B)$ proceed to the second dichroic mirror 408, in which said components are split into a reflected G component $P_G$ and a transmitted B component $P_B$. The reflected G component $P_G$ illuminates the second LCD 412 for green image, and the transmitted B component $P_B$ illuminates the third LCD 413 for blue image.

On the other hand, the R component $P_R$, reflected by the first dichroic mirror 407, is converted by the λ/2 plate 409 into S-polarized R-component $S_R$, by a rotation of the polarizing plane by 90° therein. Said R-component is then reflected by the totally reflecting mirror 410 and illuminates the first LCD 411 for red image. Said first LCD 411 rotates the polarizing direction by 90° on the R-component $S_R$ in pixels corresponding to the light area of the original color image signal to convert said R-component $S_R$ into a P-polarized R-light component $P_R$, but transmits the S-polarized R-light component $S_R$ without such rotation of the polarizing direction in the pixels corresponding to the dark area of said color image signal. The emerging R-components $P_R$ and $S_R$ are directed to the beam splitter 414, in which the R-component $P_R$ is transmitted while the R-component $S_R$ is reflected by the beam splitter 414 and diverted out of the projection optical path. Consequently said beam splitter 414 functions as an analyzer for the first LCD 411, which therefore has no polarizing plate serving as the analyzer as shown in FIG. 5.

Further the second LCD 412 for the green image, illuminated by the G-component light $P_G$ reflected by the second dichroic mirror 408, rotates the polarizing direction of the G-component $P_G$ through the pixels corresponding to the light area of the original color image signal by 90° to obtain an S-polarized G-component $S_G$, but transmits the P-polarized G-component $P_G$ without such rotation of the polarizing direction through the pixels corresponding to the dark area of said image signal. The emerged G-components $S_G$ and $P_G$ are directed toward the beam splitter 414, in which the G-component $P_G$ is transmitted through the beam splitter 415 and deflected out of the projection optical path. The other G-component $S_G$ is reflected by the beam splitter 414, then synthesized with the R-component $P_R$ emerging from said first LCD 411 and transmitted by the first beam splitter 414, and emitted as a light component $(P_R+S_G)$. Thus the beam splitter 414 also functions as the analyzer for the second LCD 412 and also employs synthesis of the R-component $P_R$ and the G-component $S_G$. Therefore the second LCD 412 does not require the polarizing plate serving as the analyzer, in the same manner as the first LCD 411.

On the other hand, the third LCD 413 for blue image, illuminated by the B-light component $P_B$ transmitted by the second dichroic mirror 408, rotates the polarizing direction, by 90°, of the B-component $P_B$ in the pixels corresponding to the light area of the original color image signal to obtain an S-polarized B-component $S_B$ but transmits the P-polarized B-component $P_B$ without such rotation of the polarizing direction in the pixels corresponding to the dark area in the same manner as the second LCD 412.

The B-components $P_B$ and $S_B$ emerging from the third LCD 413 then direct onto the beam splitter 415 and are separated therein into the reflected B-component $S_B$ and the transmitted B-component $P_B$. The reflected B-component $S_B$ directs onto the third beam splitter 416 but the transmitted B-component $P_B$ is deflected out of the projection optical path. Thus, the beam splitter 416 functions as the analyzer for the third LCD 413 in the same manner as the beam splitter 414, and the third LCD 413 therefore lacks the polarizing plate serving as the analyzer, in the same manner as the first and second LCD's 411, 412. Further another polarizing plate can be provided in order to increase the polarizing ratio of each LCD.

The B-component $S_B$ reflected by said beam splitter 415 is further reflected by the third dichroic mirror 416 and is synthesized with the light components ($P_{R+SG}$) from the beam splitter 414 to provide a synthesized light ($S_B+S_G+P_R$), which is projected onto the unrepresented screen through the projection lens 417.

The projector of this embodiment can release the light, corresponding to the dark area of the image, out of the projection optical path, and is almost free from the temperature increase of the LCD's because they have no polarizing filter serving as analyzers. Further the optical system between the projection lens and the LCD's is not complicated because the beam splitter (414 in the present embodiment) serving as the analyzer also employs synthesis of light components.

Figure 5:
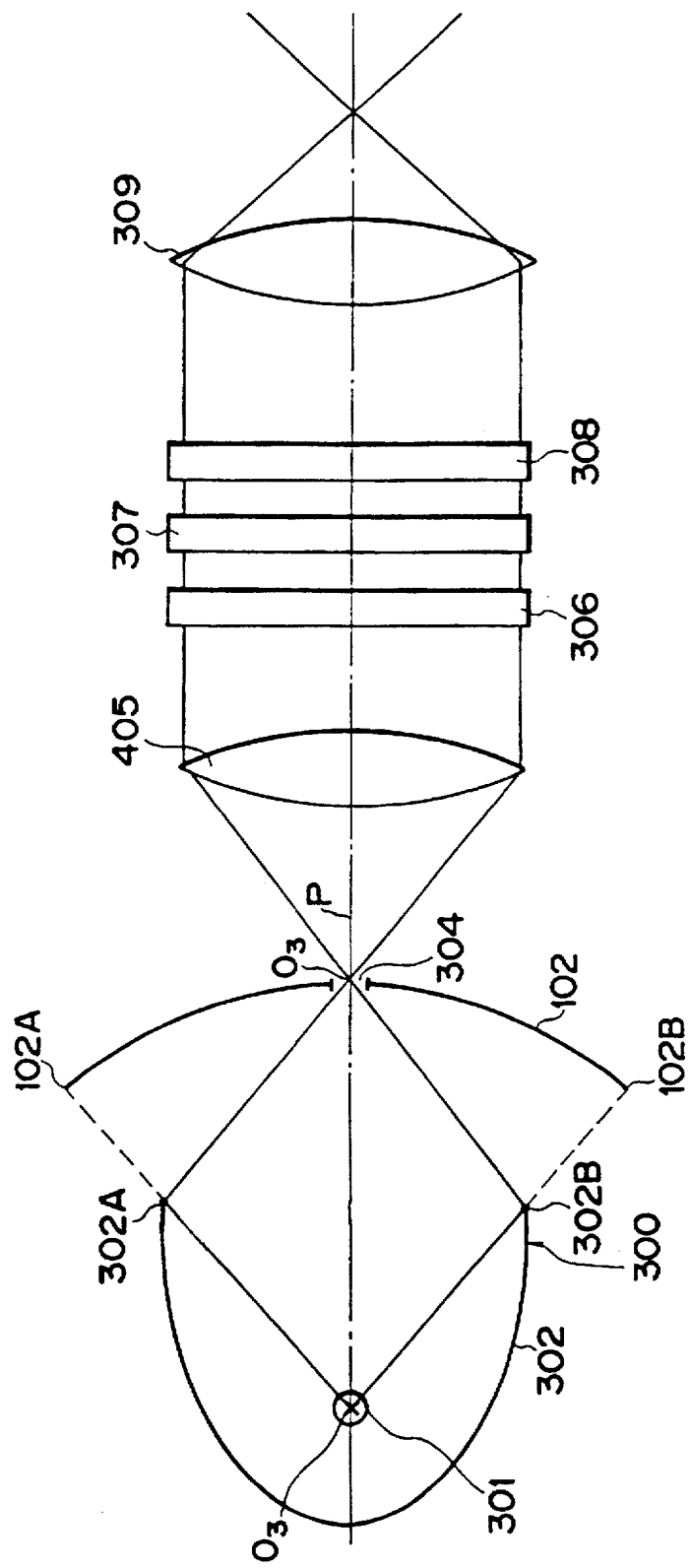
FIG. 5 is a cross-sectional view of an embodiment of the projector of the present invention.
Figure 6:
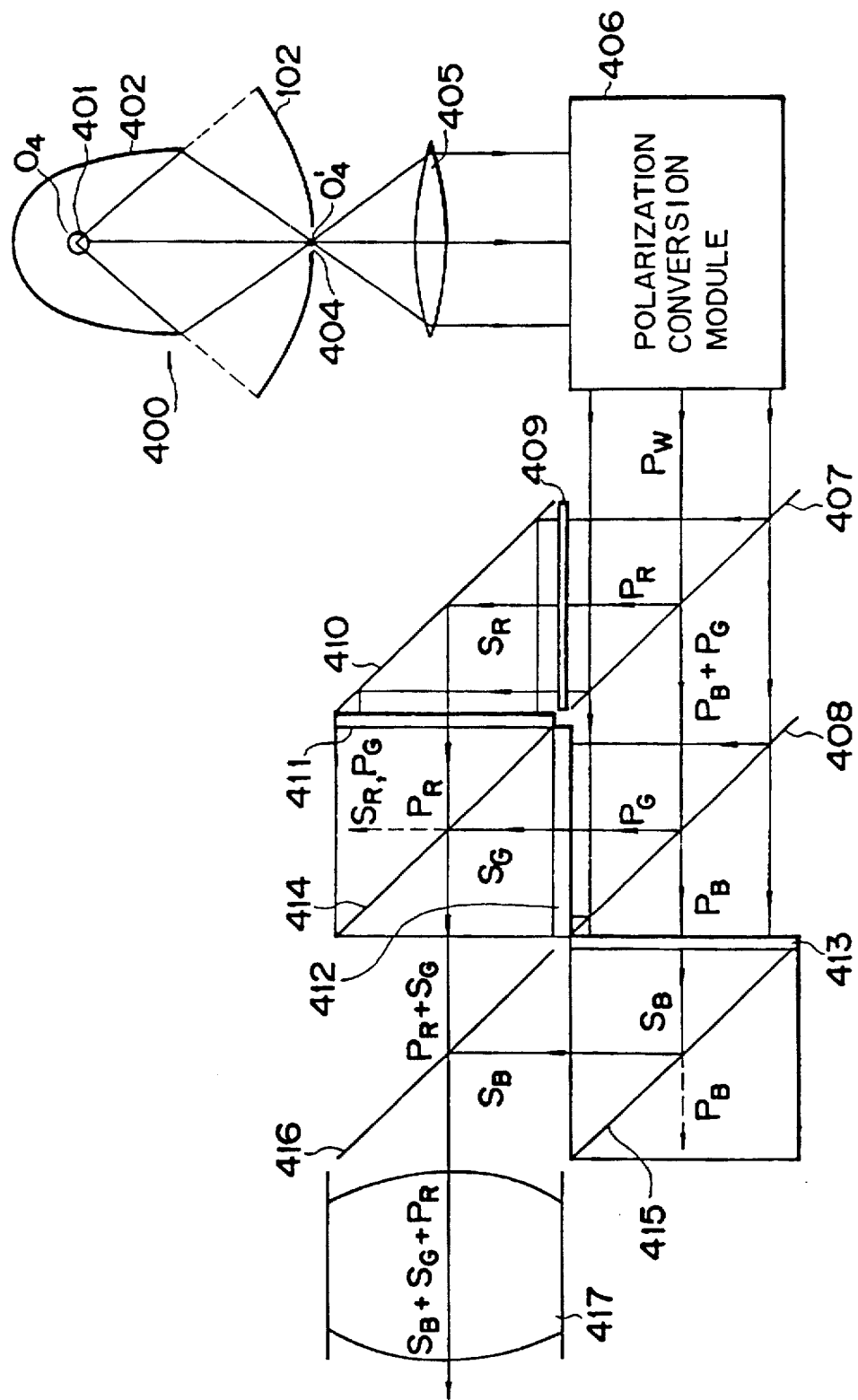
FIG. 6 is a cross-sectional view of another embodiment of the projector of the present invention.

Also in the aforementioned embodiment of the projector shown in FIG. 5, the polarizing plates employed as a polarizer and an analyzer may be replaced by polarizing beam splitters as in the case of FIG. 6. In this case, since the unnecessary light components such as the other linearly polarized light component not utilized for illuminating the liquid crystal device and the light component other than the image light emerging from the liquid crystal device are deviated out of the projection optical path, so that the temperature increase, resulting from the irradiation of the optical elements by said unnecessary light components, can be suppressed.

Figure 7:
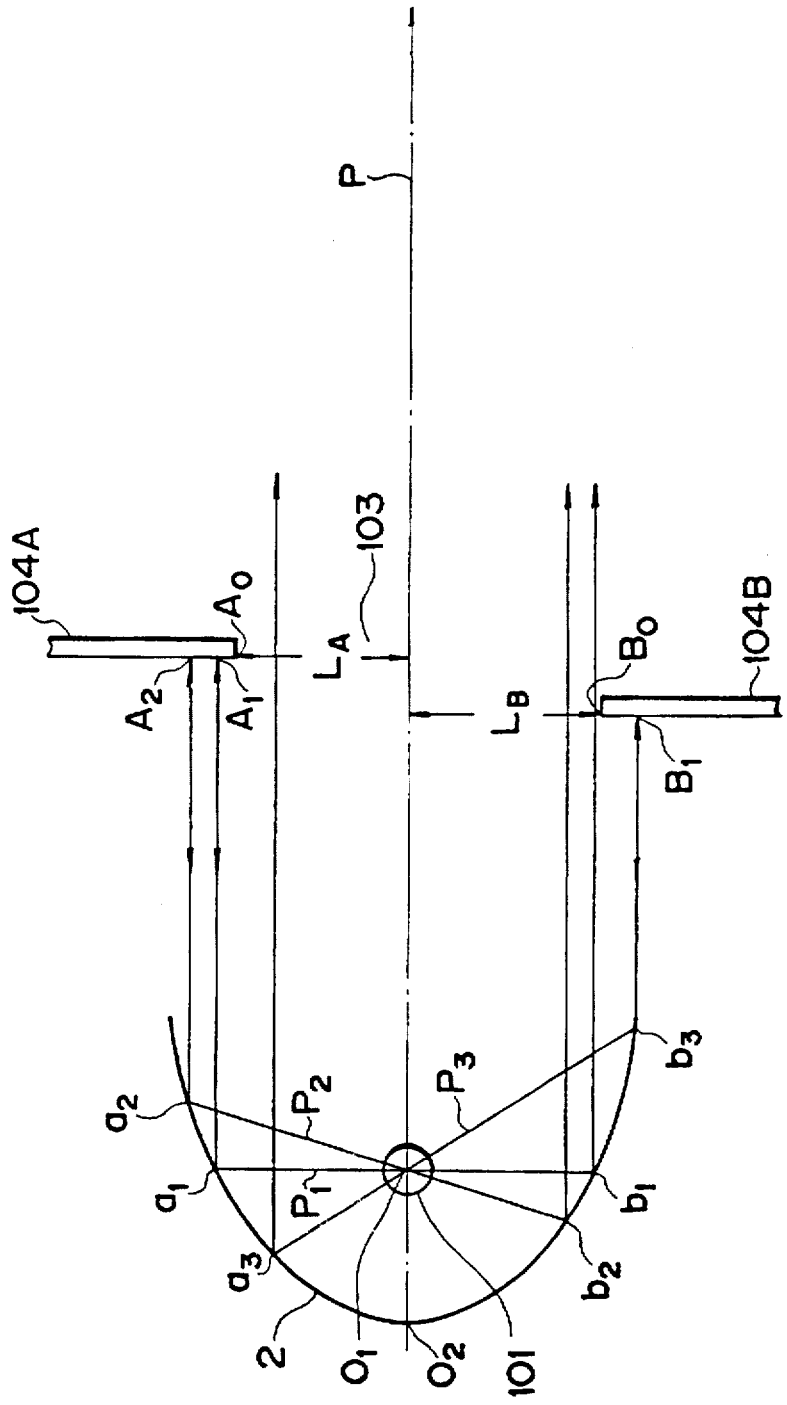
FIG. 7 is a cross-sectional view of another embodiment of the illuminating optical system of the present invention.

FIG. 7 is a cross-sectional view of another embodiment of the illuminating optical system of the present invention in which a point light source lamp 101 is positioned on a focal point $O_1$ of a parabolic reflector 2 which is rotationally symmetrical to the optical axis P, and first and second flat mirrors 104A, 104B constituting an emergent light reflecting flat mirror are provided on the optical path of the emerged light reflected by said parabolic reflector 2, perpendicularly to the optical axis P of said path.

The lamp 101 is composed, for example, of a metal halide lamp or the like with a transparent glass wall.

Since the parabolic reflector 2 is rotationally symmetrical to the optical axis P as explained above, the light emitted from said lamp 101 and reflected by said parabolic reflector 2 is formed as a parallel light beam, having a circular illuminating area on a plane perpendicular to the optical axis P.

Figure 8:
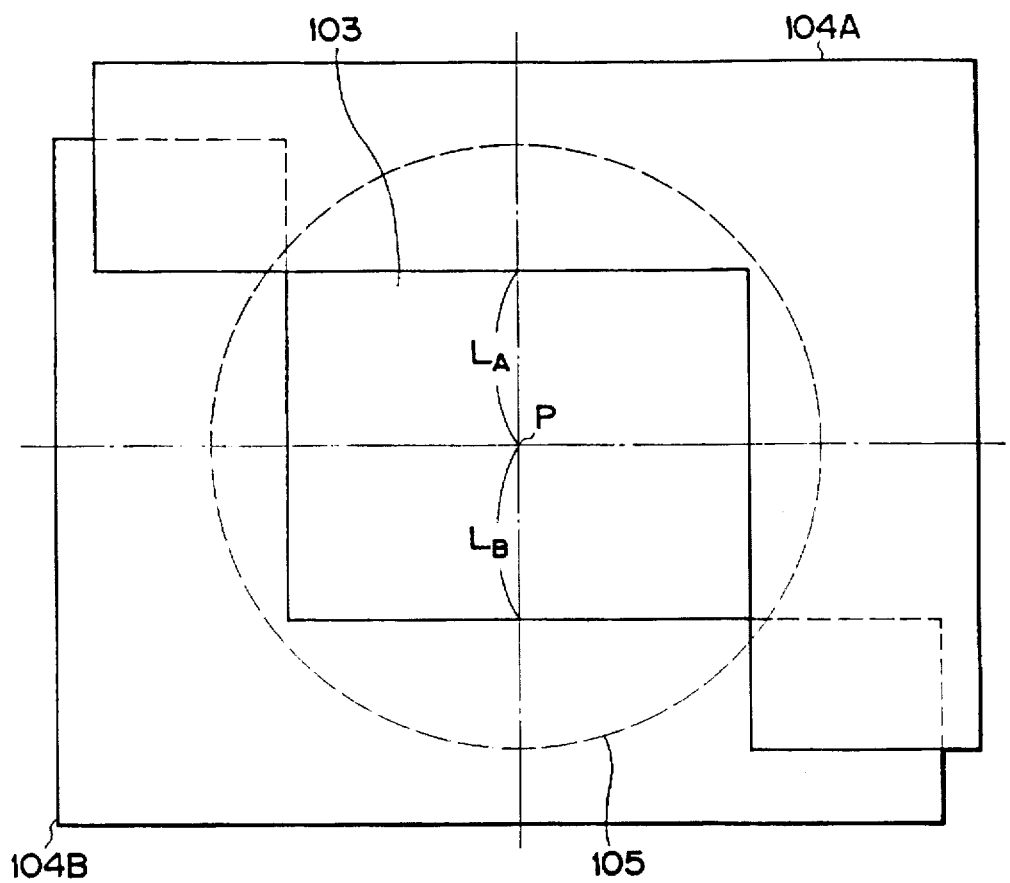
FIG. 8 is a plan view of a flat mirror for reflecting the emerging light.

Said second and first flat mirrors 104B, 104A are respectively L-shaped, and are positioned in this order from the side of the light source lamp 101, thereby defining a rectangular aperture 103 as shown in FIG. 8.

In this embodiment, the parallel light beam, generated from said lamp 101 and reflected by the parabolic reflector 2 is transmitted through said aperture 103, whereby the illuminating area is limited to a rectangular area, corresponding to the shape of said aperture 103, on a plane perpendicular to the optical axis P.

The path of the light emitted from the lamp 101 will be explained in the following.

A light beam $P_1$ emitted from the lamp 101 is reflected on a point $a_1$ of the parabolic reflector 2, and reaches the first flat mirror 104A as a parallel light beam to the optical axis P. On said first flat mirror 104A, the light beam $P_1$ is perpendicularly reflected at a point $A_1$ and returns to the lamp 101 through the same path. Since the lamp 101 has the transparent outer wall as explained above, the light beam $P_1$ is transmitted thereby, then reflected on a point $b_1$ of the parabolic reflector 2 and emerges through the aperture 103.

The above-mentioned light beam $P_1$ is the light beam emitted from the lamp 101 perpendicularly to the optical axis P and travels the paths symmetrical to the optical axis, when reflected by the first flat mirror 104A or by the second flat mirror 104B. Consequently, if the distance $L_A$ between the end $A_0$ of the first flat mirror 104A and the optical axis P and the distance $L_B$ between the end $B_0$ of the second flat mirror 104B and the optical axis P are both smaller than the distance La (or Lb) between the focal point $O_1$ and the reflecting point $a_1$ (or $b_1$) of the parabolic reflector 2, said light beam $P_1$ cannot emerge from the aperture 103.

In FIG. 7, the reflecting face of the parabolic reflector 2 can be represented by:

$$x=(y^2/4f)-f$$

by taking the original point at the focal point $O_1$, the x-axis along the optical axis P and y-axis along $a_1$–$b_1$ perpendicular to said optical axis P, and the focal length ($O_1$–$O_2$) as f. As the ordinates of the aforementioned reflecting points $a_1$, $b_1$ are represented by $a_1$=(O, 2f) and $b_1$=(O, -2f), all the light reflected in the reflecting area including the points $a_1$, $b_1$ is considered to emerge through the aperture 103 if at least either of said distance La or Lb satisfies a condition:

$$La (\text{or } Lb) \geq 2f$$

In the present embodiment, the distance Lb, and the distance $L_B$ between the end $B_0$ of the second flat mirror 104B and the optical axis P satisfy the above-mentioned condition.

On the other hand, a light beam $P_2$, after being emitted from the lamp 101, is reflected on a point $a_2$ of the parabolic reflector 102 and is directed to the first flat mirror 104A. In this case, since the distance between the optical axis P and the reflecting point $a_2$ is longer than the distance between the aforementioned reflecting point $a_1$ and the optical axis P, said light beam $P_2$ is reflected at a point $A_2$ of the first flat mirror 104A and returns to the lamp 101 through the same path. Thereafter said light beam is transmitted through said lamp 101, reflected at a point $b_2$ of the parabolic reflector 2 and is directed toward the second flat mirror 104B. Since the distance between the reflecting point $b_2$ and the optical axis P is smaller than the distance between the aforementioned point $b_1$ and the optical axis P, the light beam $P_2$ is not intercepted by the second flat mirror 104B but emerges through the aperture 103.

Also a light beam $P_3$ in a similar manner. After being emitted from the lamp 101, it proceeds through a path along the parabolic reflector (reflecting point $b_3$), second flat mirror 104B (reflecting point $B_1$), parabolic reflector 2 (reflecting point $b_3$), lamp 101, and parabolic reflector 2 (reflecting point $a_3$) and emerges through the aperture 103.

Consequently, the illuminating light beam emerging through the aperture 103 has a rectangular illuminating area on a plane perpendicular to the optical axis P, though the reflector is rotationally symmetrical.

Figure 9:
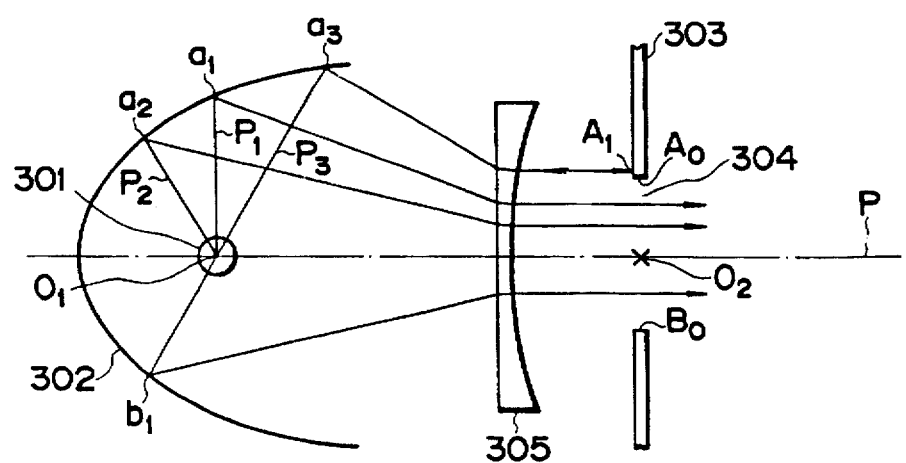
FIGS. 9, 10 and 11 are cross-sectional views of other embodiments of the illuminating optical system of the present invention.

FIG. 9 is a cross-sectional view of another embodiment of the illuminating optical system of the present invention.

In the illuminating optical system of the present embodiment, a point light source lamp 301, such as a metal halide lamp, is positioned on a first focal point $O_1$ in two focal points of an elliptical reflector 302 which is rotationally symmetrical with respect to the optical axis P. Also on the optical path of the emerging light emitted from the light source lamp 301 and reflected by the elliptical reflector 302, and between said lamp 301 and the second focal point $O_2$, there is provided a concave lens 305 for converting said emerging light into a parallel light beam, and a flat mirror 303 is further provided, with an aperture 304, perpendicularly to the optical axis P, in the optical path of the parallel light beam emerging from said concave lens 305.

The aperture 304 of said flat mirror 303 has a shape corresponding to the illuminating area, and, in the present embodiment, the flat mirror 303 is so positioned that the center of the aperture 304 coincides with the optical axis P.

In the following there will be explained the paths of the emerging light.

A light beam $P_1$, emitted from the lamp 301 perpendicularly to the optical axis P, is reflected on a point $a_1$ of the elliptical reflector 302 and is then shifted parallel to the optical axis P by the concave lens 305. Since the distance between the light beam $P_1$ and the optical axis P is smaller than the distance between said optical axis P and the end $A_0$ of the aperture 304, the light beam $P_1$ emerges through said aperture 304 of the flat mirror 303.

A light beam $P_2$ is similarly reflected at a point $a_2$ of the elliptical reflector 302 and is shifted parallel to the optical axis P by the concave lens 305. As the distance between said parallel light beam $P_2$ and the optical axis P is smaller than in the aforementioned light beam $P_1$, the light beam $P_2$ emerges through said aperture 304, similarly to the case of the light beam $P_1$.

A light beam $P_3$, after being emitted from the lamp 301, is similarly reflected at a point $a_3$ closer to the edge of the elliptical reflector 302 and is shifted parallel to the optical axis P by the concave lens 305, but it enters the flat mirror 303 since the distance between the light beam $P_3$ and the optical axis P is larger than that between said optical axis P and the end $A_0$ of said aperture 304. The light beam $P_3$ is reflected at a point $A_1$ of the flat mirror 303 and returns to the lamp 301 through the same path (reflecting point $A_1$—concave lens 305—reflecting point $a_3$). It is then transmitted by said lamp 301, reflected at a point $b_1$ of the elliptical reflector 302 and enters again the concave lens 305. The light beam $P_3$ is thus again shifted parallel to the optical axis P, but, since the distance to the optical axis P is smaller than the distance between said optical axis P and the end $A_0$ of the aperture 304, it emerges through the aperture 304 of the flat mirror 303.

In the present embodiment the flat mirror 303 is positioned on the second focal point $O_2$, but it may be provided at any position after the emerging light is converted into the parallel light beam, namely behind the concave lens 305, and said flat mirror 303 may be positioned in contact with the concave lens 305 for the purpose of compactization. Also for further compactization, the concave lens 305 may be positioned in contact, with an increased diameter, with the elliptical reflector 302. Also by positioning the flat mirror 303 between the concave lens 305 and the reflector 302 and axially moving said flat mirror 303, there may be varied the size of the illuminating area.

Figure 10:
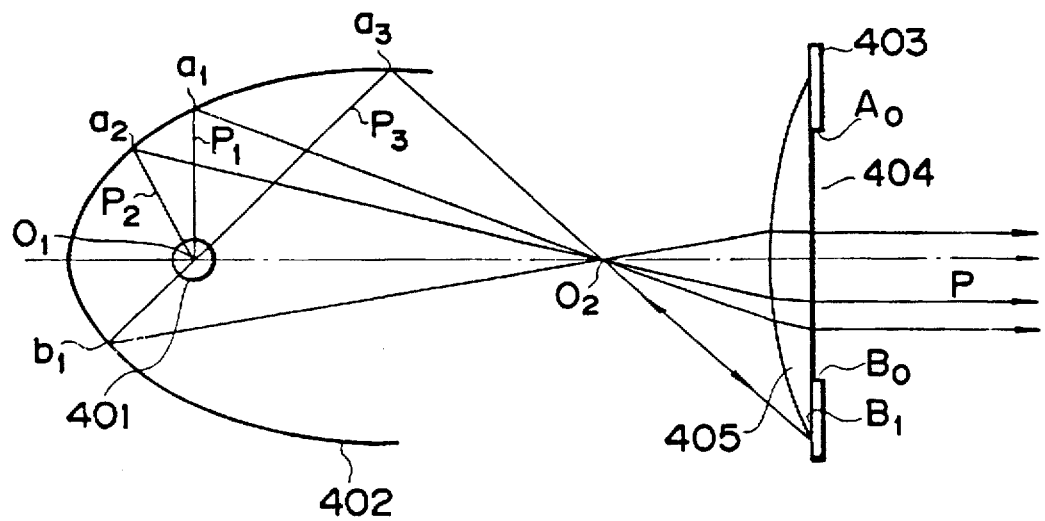

In the following there will be explained another embodiment of the illuminating optical system of the present invention, with reference to FIG. 10.

In the foregoing embodiment shown in FIG. 9, a concave lens is positioned between the second and first focal points for converting the emerging light into a parallel light beam. In the present embodiment, a convex lens 405 is provided at a side of the second focal point $O_2$, opposite to the lamp, for converting the emerging light into a parallel light beam.

In the present embodiment, a light source lamp 401 is positioned on the first focal point $O_1$ of an elliptical reflector 402 as in the foregoing embodiment shown in FIG. 9, and, as explained above, a convex lens 405 is positioned on the optical path of the emerging light, at a side of the second focal point $O_2$, opposite to the lamp 401, for converting the emerging light into a parallel light beam. Also on a face of said convex lens 405, opposite to the lamp, there is fixed a flat mirror 403 having an aperture 404 of a shape corresponding to the illuminating area.

In the following there will be explained the optical path of the emerging light.

A light beam $P_1$, emitted from the lamp 401 perpendicularly to the optical axis P, is reflected at a point $a_1$ of the elliptical reflector 402 and converges on the second focal point $O_2$. Subsequently the light beam $P_1$ enters the convex lens 405 divergingly and is shifted to a light beam parallel to the optical axis P. As the distance between the light beam $P_1$ and the optical axis P is smaller than that between said optical axis P and the end $B_0$ of said aperture 404, the light beam $P_1$ emerges through said aperture 404.

Also a light beam $P_2$ is similarly reflected by the elliptical reflector 402 (reflecting point $a_2$), then converges on the second focal point $O_2$ and is shifted parallel to the optical axis P by the convex lens 405. As the distance of said light beam $P_2$ to the optical axis P is smaller than in the case of the aforementioned light beam $P_1$, said light beam $P_2$ emerges through said aperture 404.

A light beam $P_3$ is also reflected by the ellipitical reflector 402 (reflecting point $a_3$), then converges on the second focal point $O_2$ and is shifted parallel to the optical axis P by the convex lens 405. Since the distance of said light beam $P_3$ to the optical axis P is larger than that between said optical axis P and the end $B_0$ of said aperture 404, the light beam $P_3$ is reflected at a point $B_1$ of the flat mirror 403 and returns to the lamp 401 through the same optical path (reflecting point $B_1$—convex lens 405—second focal point $O_2$—reflecting point $a_3$). The light beam $P_3$ is then transmitted by the lamp 401, reflected at a point $b_1$ of the elliptical reflector 402, then converges on the second focal point $O_2$ again and is shifted parallel to the optical axis P. In this state, since the distance of the light beam $P_3$ to the optical axis P is smaller than the distance between said optical axis P and the end $A_0$ of the aperture 404, said light beam $P_3$ emerges through said aperture 404.

Figure 11:
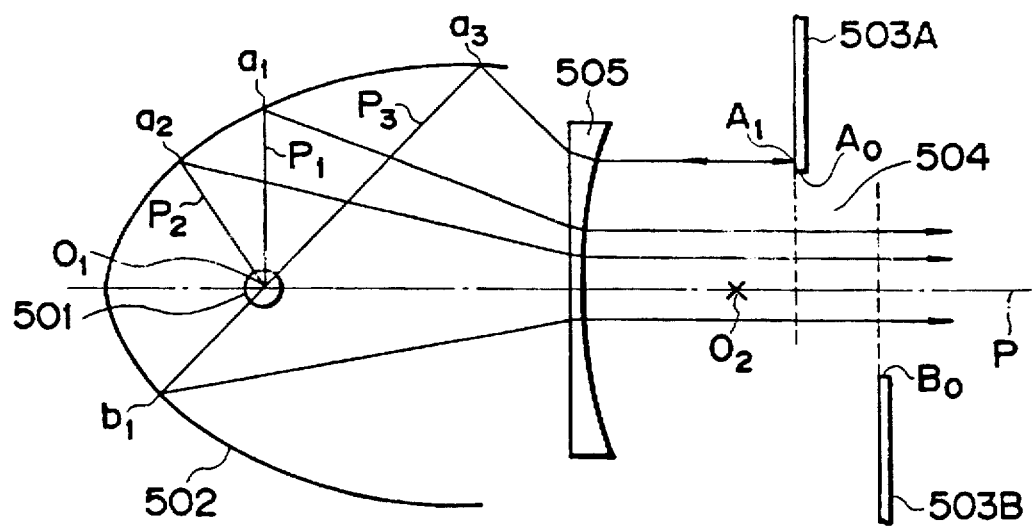

In the following there will be explained another embodiment of the illuminating optical system of the present invention, with reference to FIG. 11.

In the present embodiment, the light is emitted from a light source lamp 501 positioned at the first focal point $O_1$ then reflected by an elliptical reflector 502, thus converges on the second focal point $O_2$ and is then converted into a parallel light beam by a concave lens 505 as in the foregoing embodiment shown in FIG. 9, but first and second flat mirrors 503A, 503B are provided to constitute an aperture 504 similar to the one explained before, in the optical path of the parallel light beam emerging from said concave lens 505.

In this embodiment, said first and second flat mirrors 503A, 503B are both L-shaped and are positioned in this order from the side of the lamp 501. Said first and second flat mirrors 503A, 503B constitute, by their combination, an aperture 504 of a shape corresponding to the illuminating area, in a similar manner as the first and second flat mirrors 104A, 104B (cf. FIG. 8) employed in the foregoing embodiment shown in FIG. 7.

In the following there will be explained optical paths of the emerging light in the present embodiment.

A light beam $P_1$, emitted from the lamp 501 perpendicularly to the optical axis P, is reflected by the elliptical reflector 502 (reflecting point $a_1$), then is shifted parallel to the optical axis P by the concave lens 505 and emerges through said aperture 504.

A light beam $P_2$ is similarly reflected by the elliptical reflector 502 (reflecting point $a_2$), then shifted parallel to the optical axis P by the concave lens 505, and emerges through said aperture 504.

A light beam $P_3$ when shifted parallel to the optical axis P by the concave lens 505, has a larger distance to the optical axis P than the distance between said optical axis P and the end $A_0$ of said aperture 504. Said light beam $P_3$ is therefore reflected by the first flat mirror 503A (reflecting point $A_1$) and returns to the lamp 501 through the same path (reflecting point $A_1$—concave lens 505—reflecting point $a_3$). Subsequently the light beam $P_3$ is transmitted by the lamp 501, then reflected by the elliptical reflector 502 (reflecting point $b_1$) and is shifted parallel to the optical axis P by the concave lens 505 again. Since the distance of the light beam $P_3$ to the optical axis P is smaller than the distance between the optical axis P and the end $B_0$ of said aperture 504, the light beam $P_3$ emerges through said aperture 504.

In the foregoing embodiments, the illuminating area of the light emerging from the illuminating optical system is determined by the aperture formed in the flat mirror positioned perpendicularly to the optical axis P. Consequently, by forming said aperture corresponding to the area to be illuminated by said optical system, it is rendered possible to illuminate said area only and to re-utilize the light directed to the outside of said area, thereby significantly reducing the loss of light and improving the rate of utilization of light.

Also in the foregoing embodiments, there is defined a rectangular aperture by one or two flat mirrors, but such configuration is not limitative, and there may be employed a larger number of flat mirrors for example for defining an aperture corresponding to a circular or polygonal illuminating area. For example a configuration similar to the blades of the diaphragm employed in the cameras may be adopted, and the aperture of said blades may be suitable regulated.

In case the aperture is defined by plural flat mirrors, there may be provided suitable driving means for respectively moving said flat mirrors in order to obtain an arbitrary size in said aperture.

The light source lamp employed in the foregoing embodiments may be provided, instead of the transparent glass wall, with a diffusing glass wall such as clouded glass wall. In such lamp with a diffusing wall, the light entering said lamp is three-dimensionally diffused by said wall and thus diffused light constitutes the light of a secondary light source, and the path of thus diffused light can be considered in the same manner as in the foregoing embodiments. Also there may be employed a rod-shaped lamp instead of the point-shaped lamp, and, in such case each reflector may be constructed in tubular manner.

The parabolic or elliptical reflector can be provided inexpensively by a metal structure such as pressed aluminum, but, for a higher reflectivety, there may be employed a thin metal film or an alloy coating. Also for heat dissipation, the reflectors may be composed of cold mirrors.

In the following there will be explained embodiments of the projector of the present invention.

Figure 12:
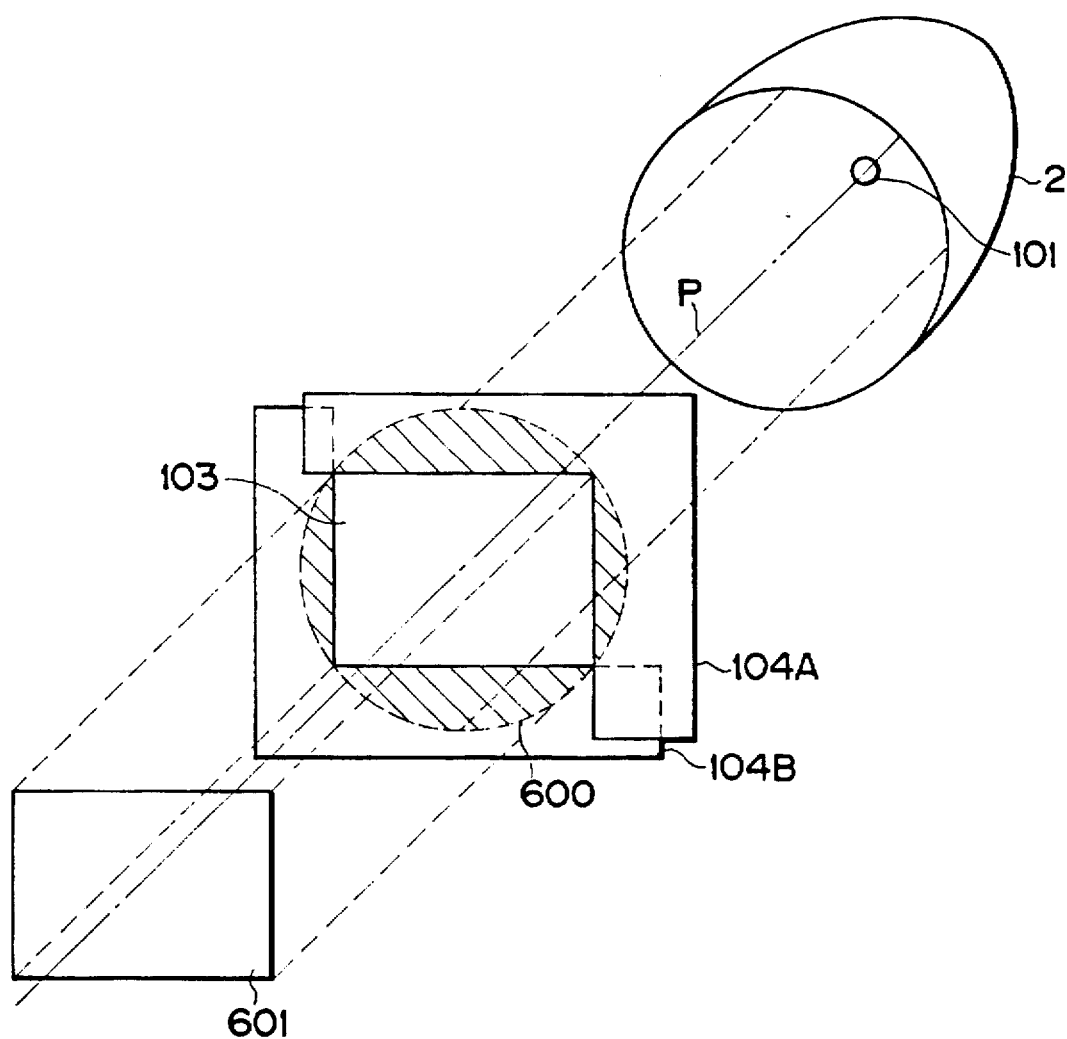
FIGS. 12 and 13 are perspective views showing other embodiments of the projector of the present invention.

FIG. 12 is a perspective view of an embodiment of the projector of the present invention.

The projector of the present embodiment is provided with an illuminating optical system composed, as shown in FIG. 7, of a light source lamp 101, a parabolic reflector 2, and first and second flat mirrors 104A, 104B, and a transmissive liquid crystal device 601 constituting image forming means which is to be irradiated by the light from said illuminating optical system and is to emit the image bearing light, wherein the image bearing light emitted from said liquid crystal device 601 is projected in magnified manner by an unrepresented projection lens. In the present embodiment, the aperture 103 defined by the first and second flat mirror 104A, 104B is so formed as to correspond to the area to be illuminated of the liquid crystal device 601.

The light emitted from the lamp 101 of said illuminating optical system is reflected by the parabolic reflector 2 to form a parallel light beam, which irradiates the first and second flat mirrors 104A, 104B with a circular illuminating area 600. Within said light falling on the first and second flat mirrors 104A, 104B, that passing through the aperture 103 illuminates the liquid crystal device 601 with an illuminating area corresponding to the area to be illuminated of said device 601.

On the other hand, the light beam which does not pass the aperture 103 is reflected by the first or second flat mirror 104A or 104B, thus returning to the lamp through the same path, and is reflected again by the parabolic reflector 2 for direction toward the first and second flat mirrors 104A, 104B. Since the optical path is closer to the optical axis P than in the previous time in which the light failed to pass the aperture 103, the light directed toward the first and second flat mirrors 104A, 104B passes the aperture 103 this time, thus illuminating the liquid crystal device 601.

Figure 13:
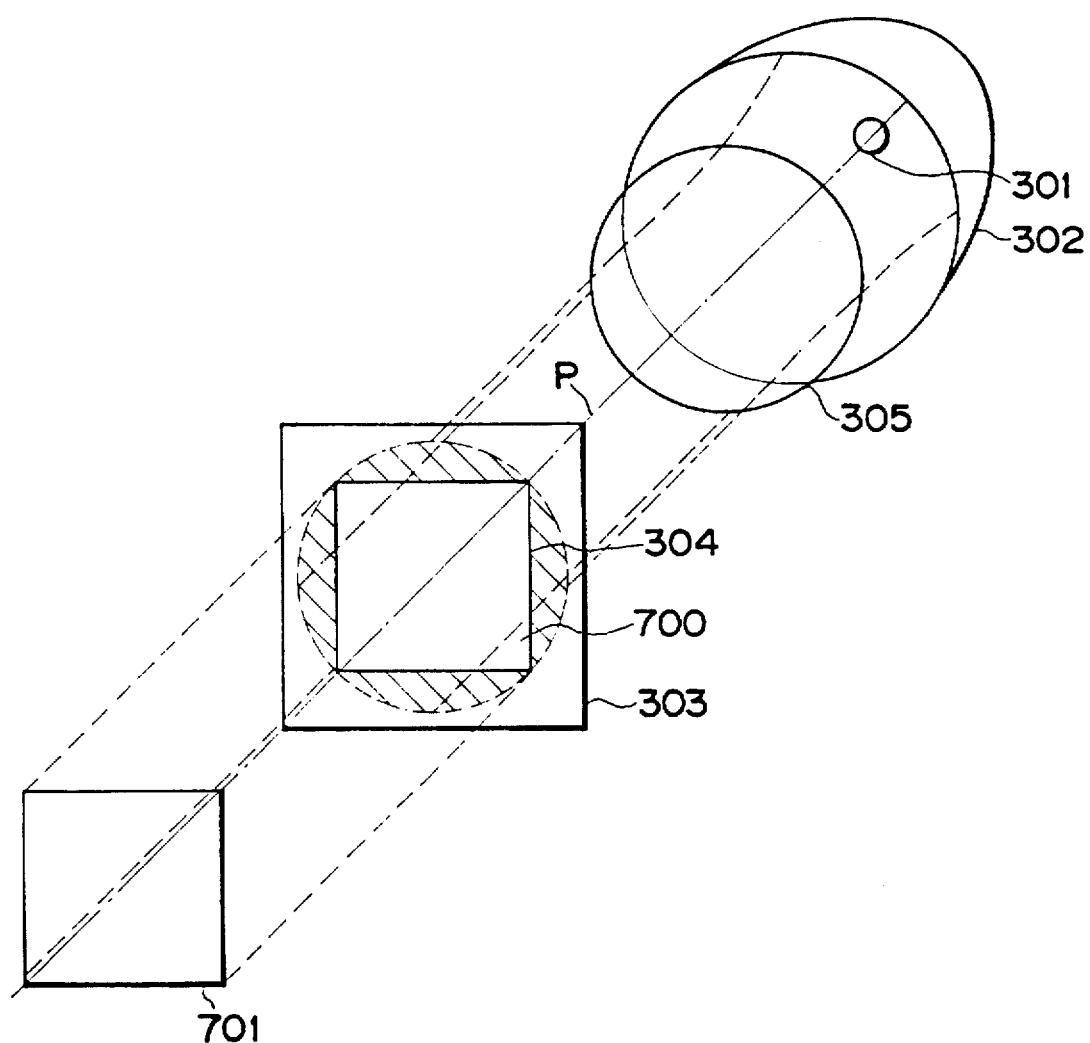

FIG. 13 is a perspective view showing another embodiment of the projector of the present invention.

The projector of the present embodiment is provided with an illuminating optical system composed, as shown in FIG. 9, of a light source lamp 301, an elliptical reflector 302 and a flat mirror 303 having an aperture 304, and a transmissive liquid crystal device 701 constituting the image forming means, wherein the image bearing light emerging from said liquid crystal device 701 is projected through an unrepresented projection lens. In this embodiment, the aperture 304 of the flat mirror 303 has a shape corresponding to the area to be illuminated of the liquid crystal device 701.

The light emitted from the lamp 301 is reflected by the elliptical reflector 302, and is converted by a concave lens 305 into a parallel light beam, which irradiates the flat mirror 303, with a circular illuminating area. Within the light falling on said flat mirror 303, a portion passing the aperture 304 illuminates the liquid crystal device 701, with an illuminating area corresponding to the area to be illuminated of said device 701.

The remaining portion that does not pass the aperture 304 is reflected by the flat mirror 303 and returns to the lamp through the same path. It is reflected again by the elliptical reflector 302 and directed toward the flat mirror 303. As the optical path is now closer to the optical axis P, the light re-entering the flat mirror 303 passes the aperture 304 and illuminates the liquid crystal device 701.

In the foregoing embodiments of the projector, the flat mirror having the aforementioned aperture is positioned between the liquid crystal device constituting the image forming means and the light source lamp, but a similar effect can be attained by positioning said liquid crystal device between the light source lamp and the flat mirror.

The foregoing embodiments show a monochromatic display apparatus equipped with a liquid crystal device as the image forming means, but a similar concept is applicable to a color image display apparatus equipped with three liquid crystal devices for respectively forming red, green and blue images.

Figure 14:
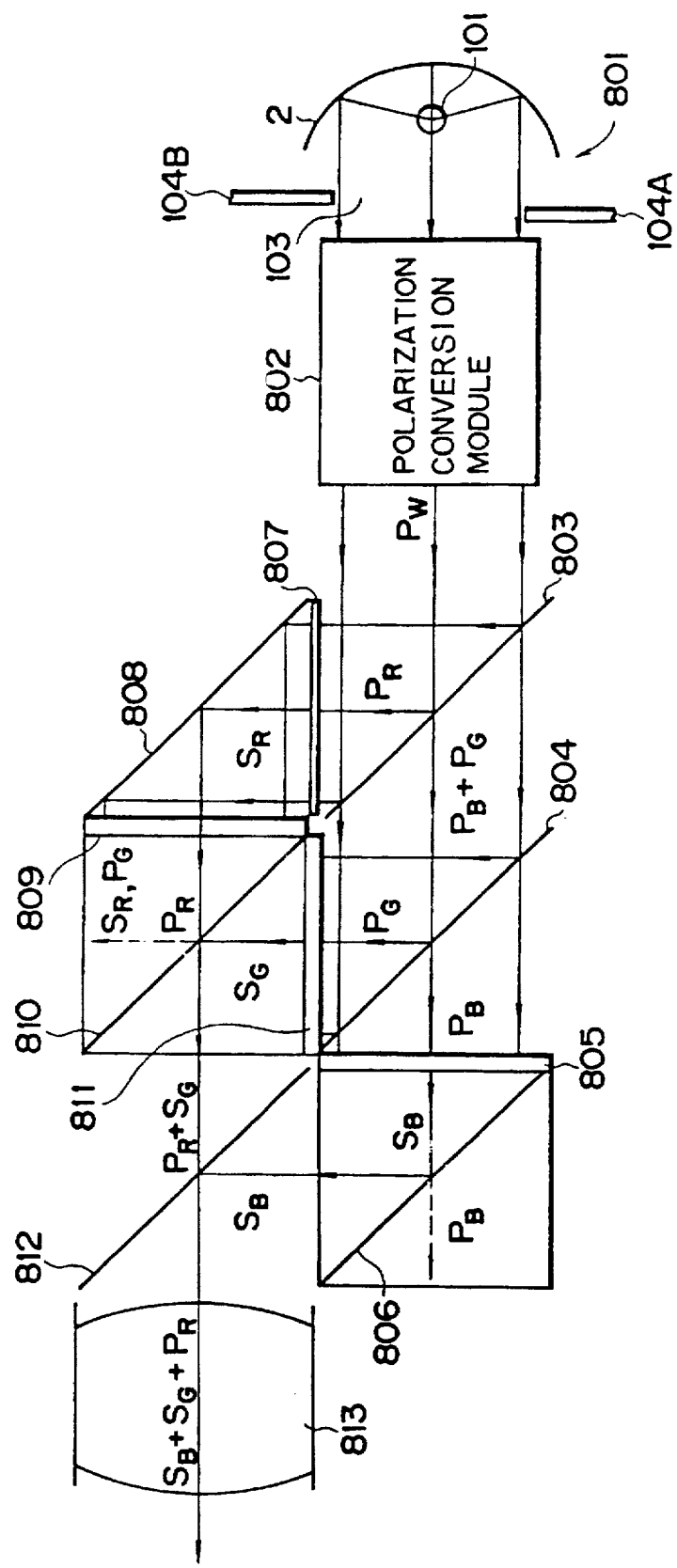
FIG. 14 is a cross-sectional view of another embodiment of the projector of the present invention.

In the following the above-mentioned color image display apparatus will be explained with reference to FIG. 14, which illustrates another embodiment of the projector of the present invention.

In the projector of the present embodiment, the white light emitted by an illuminating optical system 801, similar to that shown in FIG. 7, is converted, in a polarizing converter module 802, into polarized light of an aligned polarizing direction, which is separated into red (R), green (G) and blue (B) lights by means of first and second dichroic mirrors 803, 804, a λ/2 plate 807 and a totally reflecting mirror 808. Thus separated R, G and B lights respectively illuminate first to third liquid crystal devices (LCD's) 809, 811, 805, and the R, G and B lights transmitted by said LCD's and bearing images are synthesized by a third dichroic mirror 812 and polarizing beam splitters 806, 810 and are projected through a projection lens 813 onto an unrepresented screen.

The illuminating optical system 801 is provided, as shown in FIG. 7, with a light source lamp 101 on a focal point of a parabolic reflector 2 which is rotationally symmetrical to the optical axis, and first and second flat mirrors 104A, 104B on the exit optical path, perpendicularly to the optical axis thereof.

In the present embodiment, the first and second flat mirrors 104A, 104B define an aperture 103 of which shape corresponds to the area to be illuminated of said LCD's 809, 811, 805 constituting the objects to be illuminated.

The polarizing converter module 802 can be equivalent to that disclosed in Japanese Patent Application Laid-open Nos. 61-90584 and 63-197913, and, in the present embodiment, it is so designed that the polarizing direction of the emerging light is P-polarized to the first dichroic mirror 803.

The LCD's 809, 811, 805 are of transmissive type of a same form, for respectively forming red, green and blue images, and serve to modulate each pixel according to each original color image signal. Said modulation is achieved by rotating the polarizing direction of the emerging light by 90° with respect to that of the incident light.

The first dichroic mirror 803 transmits the G and B lights but reflects the R light, while the second dichroic mirror 804 transmits the B light but reflects the R and G lights, and the third dichroic mirror 812 transmits the R and G lights but reflects the B light.

In the following there will be explained the function of the present embodiment.

The illuminating optical system 801 emits white light of an illuminating area corresponding to the area to be illuminated of the LCD's 809, 811 and 805, and said white light is converted by the polarizing converter module 802 into P-polarized white light $P_W$, which enters the first dichroic mirror 803 and is separated into a reflected R component $P_R$ and transmitted G and B components ($P_G+P_B$). The R-component $P_R$ reflected by the first dichroic mirror 803 is directed toward the λ/2 plate 807, while the components ($P_G+P_B$) transmitted by the dichroic mirror 803 are directed toward the second dichroic mirror 804, in which said components are separated into a reflected G-component $P_G$ and a transmitted B-component $P_B$. The reflected G-component $P_G$ illuminates the second LCD 811 for green image formation, while the tramsmitted B-component $P_B$ illuminates the third LCD 805 for blue image formation.

On the other hand, the R-component reflected by the first dichroic mirror 803 is transmitted by the λ/2 plate 807, whereupon the polarizing direction is rotated by 90° to generate an S-polarized R-component $S_R$, which is then reflected by the totally reflecting mirror 808 for illuminating the first LCD 809 for red image formation. Said first LCD 809, in the pixels corresponding to a light area of the original color image signal, rotates the polarizing direction of the R-component $S_R$ to obtain a P-polarized R-component $P_R$, but, in the pixels corresponding to a dark area, transmits the S-polarized R-component $S_R$ without such rotation of the polarizing direction. The R-components $P_R$ and $S_R$ are directed to the polarizing beam splitter 810, in which the R-component $P_R$ is transmitted but the other R-component $S_R$ is reflected and deflected from the projection optical path. Thus said polarizing beam splitter 810 functions as the analyzer for the first LCD 809, which therefore lacks the polarizing filter serving as the analyzer.

Also the second LCD 811 for green image formation, illuminated by the G-component $P_G$ reflected by the second dichroic mirror 804, rotates the polarizing direction, by 90°, of said G-component light $P_G$ in the pixels corresponding to a light area of the original color image signal thereby generating an S-polarized G-component $S_G$ but transmits the P-polarized G-component $P_G$ without rotation of the polarizing direction in the pixels corresponding to a dark area. The emerging G-components $S_G$ and $P_G$ are directed to the polarizing beam splitter 810, in which the G-component $P_G$ is transmitted and is deviated from the projection optical path, while the other G-component $S_G$ is reflected and is synthesized with the R-component $P_R$ emerging from said first LCD 809 and transmitted by said beam splitter 810, thereby generating a light component ($P_R+S_G$). Thus the beam splitter 810 functions also as an analyzer for the second LCD 811 and effects synthesis of the R-component $P_R$ and the G-component $S_G$. Consequently the second LCD 811 also lacks the polarizing filter serving as the analyzer, as in the first LCD 809.

The third LCD 805 for blue image formation, illuminated by the B-component $P_B$ transmitted by said second dichroic mirror 804, as in the aforementioned second LCD 811, rotates the polarizing direction, by 90°, the B-component $P_B$ in the pixels corresponding to a light area of the original color image signal to generate an S-polarized B-component $S_B$ but transmits the P-polarized B-component $P_B$ without such rotation of the polarizing direction in the pixels corresponding to a dark area.

The B-components $P_B$ and $S_B$ emerging from said third LCD 805 are directed toward the polarizing beam splitter 806, in which said components are separated into the reflected B-component $S_B$ and the transmitted B-component $P_B$. The reflected component $S_B$ is directed toward the third dichroic mirror 804, but the transmitted B-component $P_B$ is deflected from the projection optical path. Thus, said beam splitter 806 functions as the analyzer for the third LCD 805, which therefore lacks the polarizing filter serving as the analyzer, as in the first and second LCD's 809, 811.

The B-component $S_B$ reflected in said beam splitter 806 is further reflected in the third dichroic mirror 812 and is synthesized with the light components ($P_R+S_G$) coming from the beam splitter 810, thus providing a synthesized light ($S_B+S_G+P_R$) which is supplied to and projected by the projection lens 813 onto the unrepresented screen.

The projector of the present embodiment is almost free from the temperature increase of LCD's resulting from the light absorption in the polarizing filters, since the light corresponding to the dark area of the image is released from the projection optical path so that each LCD lacks the polarizing filter serving as the anlayzer. Also the optical system between the projection lens and the LCD's is not complicated, because the beam splitter serving as the analyzer (810 in the present embodiment) functions also for color synthesis.

The projector of the present embodiment employs the illuminating optical system equipped with the parabolic reflector 2, but an illuminating optical system utilizing an elliptical reflector can be employed in a similar manner.

In the foregoing embodiments of the illuminating optical system and the projector, the aperture defined by the flat mirror or mirrors is preferably formed same as the area to be illuminated if the light-emitting part of the light source lamp constitutes a completely point light source, but, in practice, said aperture and said area to be illuminated may be somewhat different in shape, since the illuminating light beam is not completely parallel due to the certain finite size of said light-emitting part. It is therefore possible to further improve the efficiency of light utilization, by forming said aperture corresponding to the area to be illuminated, in consideration of the above-mentioned factors.

Also same effects can be attained in the foregoing embodiments by replacing the flat mirror with the corner cube array.

Figure 15:
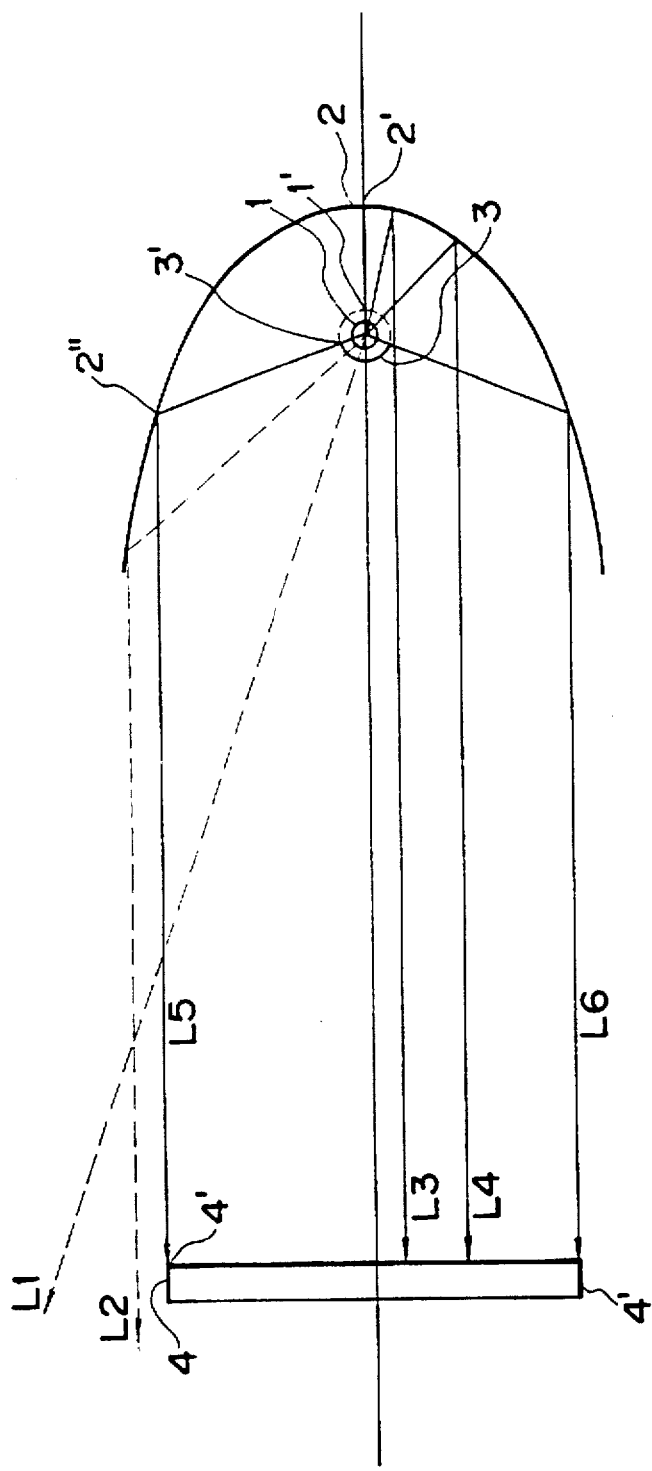
FIG. 15 is a schematic view of another embodiment of the illuminating optical system of the present invention.

FIG. 15 shows another embodiment of the present invention, wherein shown are a light source 1; a parabolic reflector 2; a spherical reflector 3 constituting a sub reflector; an object 4 to be illuminated, which is a liquid crystal light valve (LCD) in the present embodiment; and light beams L1–L6.

The light source 1 is positioned at the focal point of the reflector 2. The spherical reflector 3 is so positioned that the center of curvature thereof is at the light source 1, and has a mirror face at the side of the light source 1. The edge 3' of the reflector 3 is defined by the light beams L5, L6 reaching the edge part 4' of the LCD 4. The reflector 3 substantially perpendicularly reflects the light directly emerging without reflection by the reflector 2, such as the light beam L1, and the light which is reflected by the reflector 2 and emerges to the front but falls on the outside of the area to be illuminated of the LCD 4, such a light beam L2, thereby concentrating such lights to the light source 1. These lights behave as if they are directly emitted from the light source 1 and are reflected by the reflector 2, thus illuminating the LCD 4.

A bottom portion 2' of the reflector 2 is usually used for fixed a support member 1' for the light source 1 and does not serve as the reflector, but the light proceeding from the light source 1 to said bottom portion 2' is limited and negligible because of the presence of said support member 1'.

The radius of the spherical reflector 3 is preferably as small as possible, because a part of, the light beam released to the front by the reflector 2 is intercepted by the reflector 3. For example, if the light source 1 is completely point-shaped, there will result an unillumirated area due to such interception by the spherical reflector 3. In practice substantially uniform illumination is attained by the non-parallel light beams resulting from the finite size of the light source 1, but the illumination may become darker in the vicinity of the optical axis if the reflector 3 is excessively large.

In the present embodiment the reflector is composed of a spherical reflector, but the scope of the present invention also covers a configuration in which said reflector 3 does not have the reflecting function in the vicinity of the optical axis, whereby the light from the light source can directly illuminate the area in the vicinity of the optical axis.

FIGS. 16, 17, 18A and 18B illustrate still another embodiment in which the shape of the spherical reflector, shown in FIG. 15, is defined for a rectangular illumination area.

Figure 16:
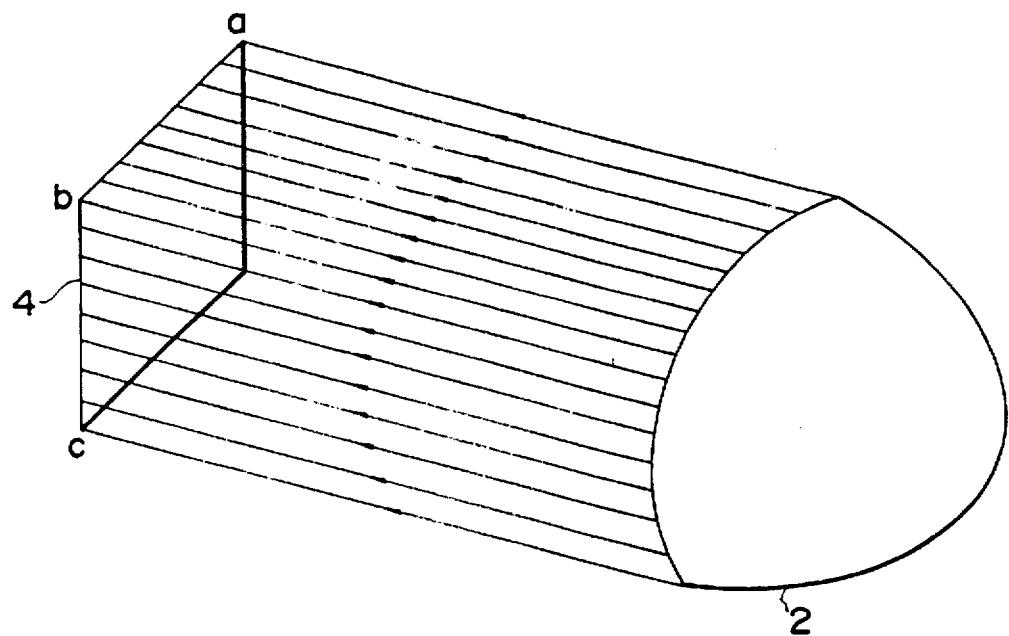
FIG. 16 is a view showing the function of another embodiment of the illuminating optical system of the present invention.

FIG. 16 is a perspective view showing the LCD 4 and the parabolic reflector 2, wherein a, b and c indicate corners of a rectangular LCD. Arrows indicate parallel light beams proceeding to the edges ab and bc of the LCD 4. When inversely traced, these light beams are reflected by the reflector 2, and reach the light source 1, passing by the edge portion (corresponding to 3' in FIG. 15) of the reflector 3 (not shown).

Figure 17:
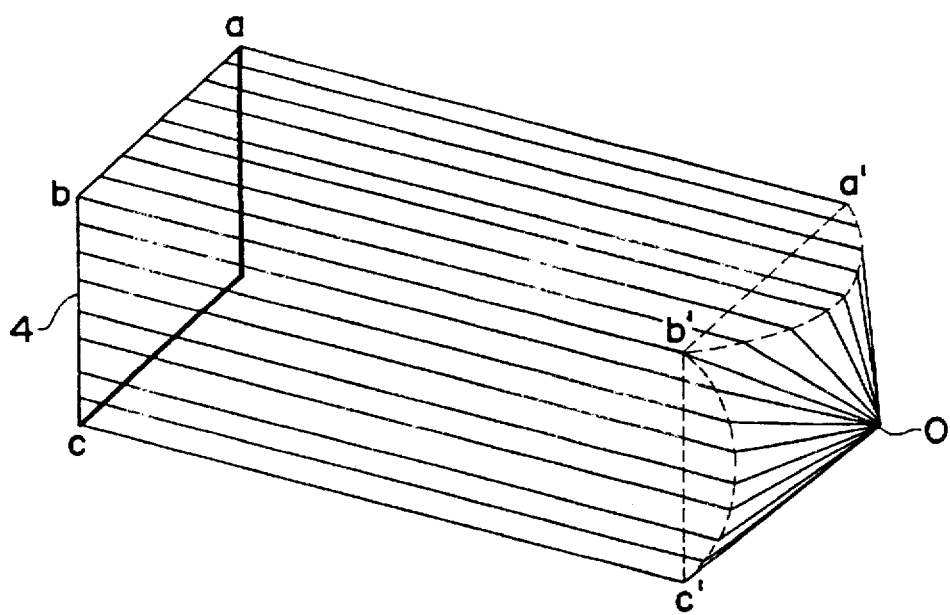
FIG. 17 is a view showing the function of another embodiment of the illuminating optical system of the present invention.

FIG. 17 shows the state of these light beams, with the reflector 2 removed. The light beams reaching the corners a, b, c of the LCD 4 have reflecting points a', b', c' on the reflector 2. Arcs a'b' and b'c' indicate the trajectories of the reflection points, on the reflector 2, of the parallel light beams reaching the edges ab, bc of the LCD 4. A point o indicates the focal point of the parabolic reflector 2, where the light source 1 is positioned. The parallel light beams reaching an edge ab of the LCD 4 proceed on a conical plane defined by the focal point o and the arc a'b', then reflected on the arc a'b' (a parabolic arc as will be explained later) on the reflector 2, and proceed along a plane abb'a'.

Figure 18A:
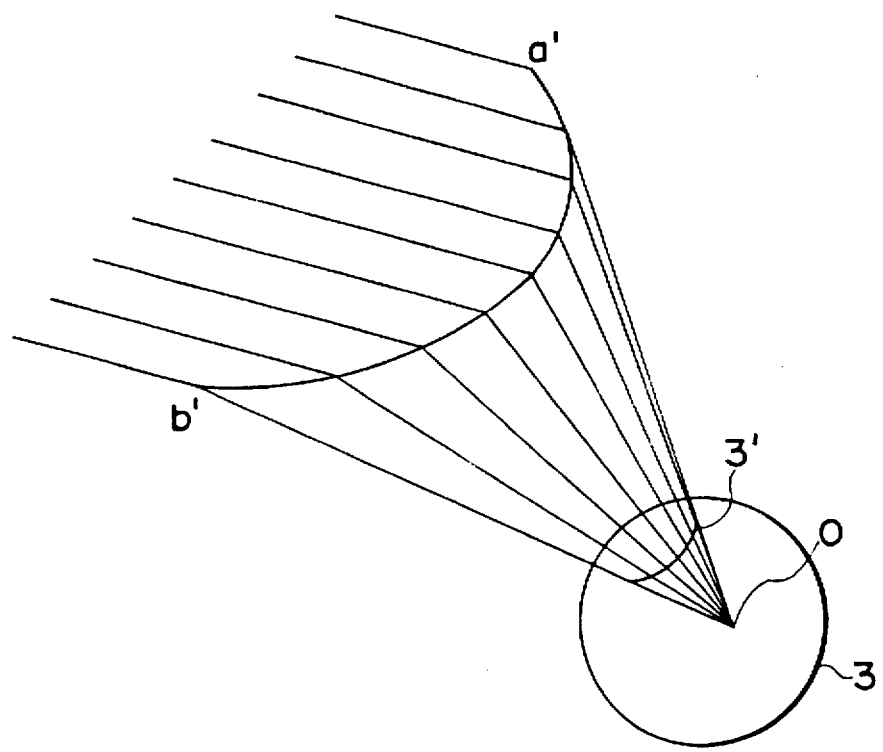
FIGS. 18A and 18B are partial schematic views of another embodiment of the illuminating optical system of the present invention.
Figure 18B:
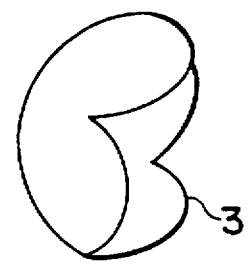

FIG. 18A is a magnified view of the vicinity of the light source 1 shown in FIG. 17. The edge of the spherical reflector 3, positioned close to the light source 1 at o, consists of a curve 3' defined by the conical plane formed by the focal point o and the arc a'b'. In the present embodiment, the LCD 4 has a rectangular boundary defined by longer and shorter edges or by four straight lines, so that the edge of the reflector 3 is defined by four curved lines. FIG. 18B shows the shape of the spherical reflector 3, defined by curves 3' as shown in FIG. 18A.

Figures 19A, 19B:
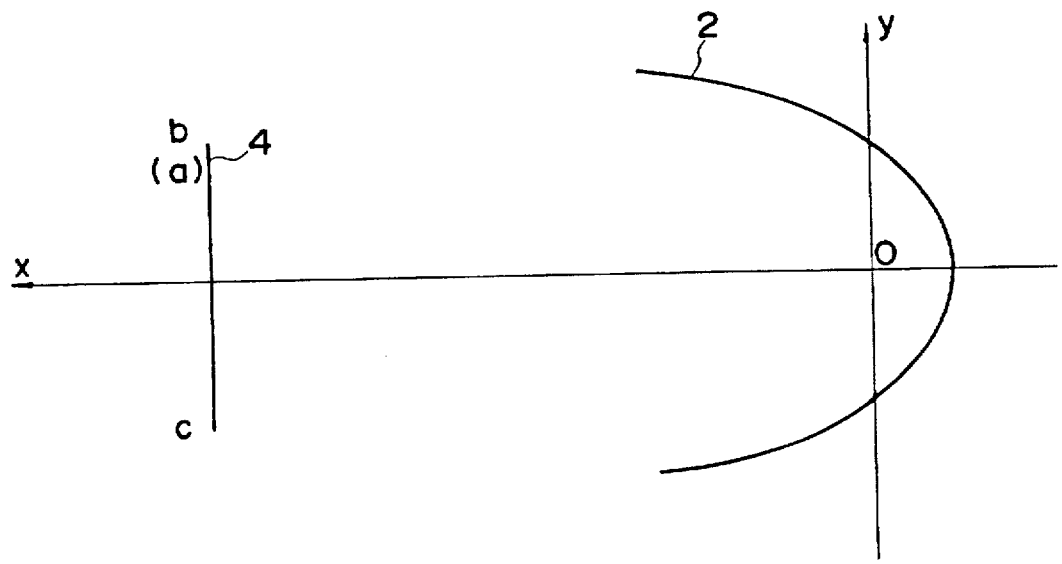
FIGS. 19A and 19B are views showing the function of another embodiment of the illuminating optical system of the present invention.

The curve 3' can be mathematically represented in the following manner, with the original point at the focal point o and x- and y-axes taken as shown in FIGS. 19A and 19B. The z-axis is taken perpendicularly to the plane of drawing, with the minus side in front. By taking the corners a, b of the LCD 4 at the ordinates (t, A, B) and (t, A, –B), the LCD 4 exists in ranges $-A \leq y \leq A$ and $-B \leq z \leq B$. With the focal length F of the reflector 2 and the radius R of the reflector 3, the shapes of the reflectors 2, 3 can be represented as:

$$x=\{(y^2+z^2)/4F\}-F \qquad (1)$$

and $$x^2+y^2+z^2=R^2 \qquad (2)$$

The plane abb'a' shown in FIG. 17 is represented by y=A. The arc a'b' defined as the crossing line of the plane abb'a' and the parabolic reflector 2 is represented by:

$$x=(z^2/4F)+(A^2/4F-F), \quad -B \leq z \leq B \qquad (3)$$

This equation corresponds to a parabola on the x-z plane.

A straight line connecting a point $z=z_0$ represented by the equation (3) in the range $-B \leq z \leq B$ and the original point o can be represented by:

$$x/x_0=y/y_0=z/z_0 \qquad (4)$$

wherein $$x_0=(z_0^2/4F)+(A^2/4F+F)$$

$$y_0=A.$$

As the curve 3' is the crossing line of the equations (2) and (4), these equations are solved as simultaneous equations to provide the following solutions:

$$x=k(z_0+A-4F^2)/4F$$

$$y=kA$$

$$z=kz_0$$

wherein $k=R[1/\{(z_0^2+A^2-4F^2)/4F+A^2+z_0^2\}]^{1/2}$ $-B \leq z_0 \leq B$

The curve 3' is represented by the trajectory of the points represented by the above-shown equations.

Figure 20:
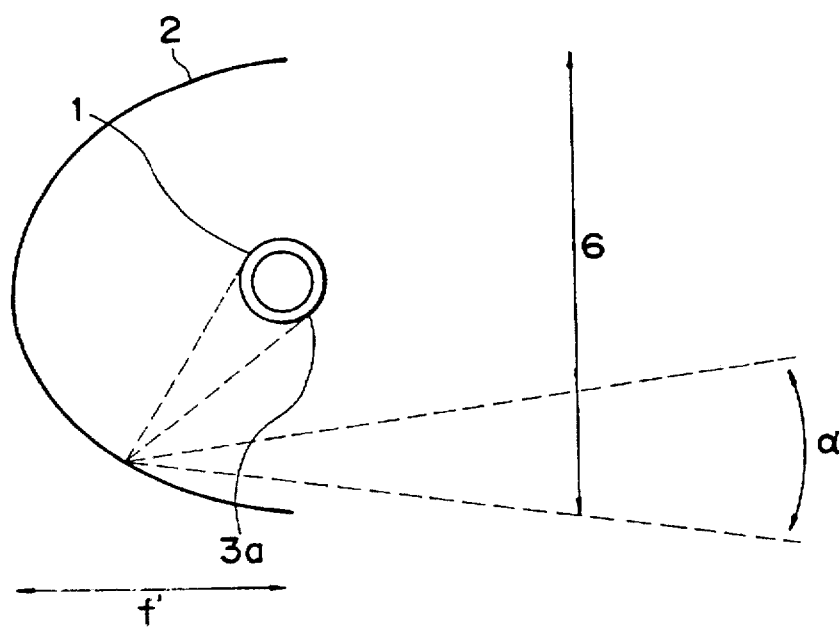
FIG. 20 is a partial schematic view of another embodiment of the illuminating optical system of the present invention.

FIG. 20 shows another embodiment, wherein components equivalent to those in the foregoing embodiment are represented by same numbers.

In the present embodiment, the reflector 3 is replaced by a reflecting film 3a, formed by evaporation on the bulb surface of the light source 1. Said reflecting film 3a is so designed, on the reflecting face thereof, to principally effect normal reflection, with limited diffusion. However the reflecting film 3a is so designed to absorb some portion of the light, in order to maintain the temperature of the light source 1. The light source 1 is positioned that the center of light emission is at the focal point of the parabolic reflector 2, with a focal length f'.

In the configuration shown in FIG. 20, within the light emitted from the light source 1, the portion directly received by the reflector 2 has a steric angle of $2\pi$, and the remaining portion (with a steric angle $2\pi$) is fetched by the reflecting film 3a. For a given diameter of the exit aperture 6, the focal length of the reflector 2 has to be made smaller in the conventional configuration in order to receive a larger proportion of the light from the light source 1 by the reflector 2, but, in the present embodiment, said focal length need not be made smaller because all the light emitted to the front from the light source is directed thereto by the reflecting film 3a. This fact means that the spreading angle α f the emerging light beam emitted from the light source 1 and reflected by the reflector 2 can be made smaller than in the conventional configuration, so that the parallel level of the emerging light beam is improved.

Also the present embodiment provides a very compact configuration of the light source and the reflector, since the depth of the parabolic reflector 2 can be made comparable to the focal length f'.

Figure 21:
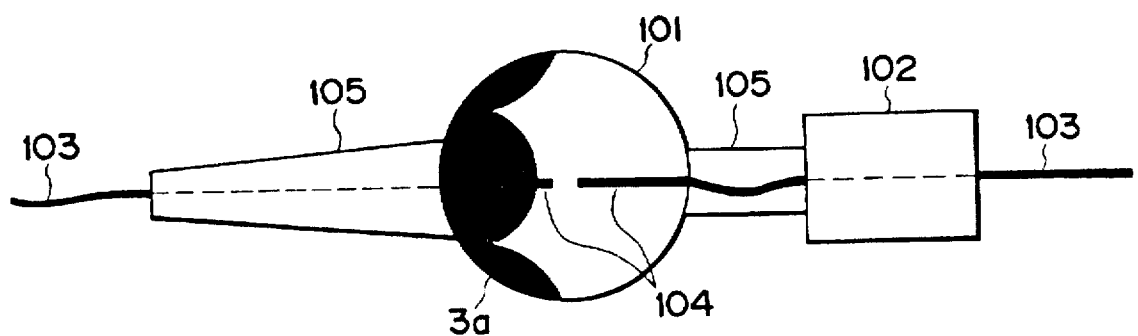
FIG. 21 is a partial schematic view of another embodiment of the illuminating optical system of the present invention.

FIG. 21 shows another embodiment, which is a modification of the embodiment shown in FIG. 20, and is designed for a rectangular illuminating area. The shape of the reflecting film 3a is defined as already explained in relation to FIGS. 16, 17, 18A and 18B.

This embodiment employs a metal halide lamp, with electrodes on both ends, and the bulb surface is formed semispherically. There are shown a bulb 101 of glass or quartz; a ceramic support member 102; power supply electrodes 103; light-emitting electrodes 104; and support parts 105 for the bulb 101 and electrodes 103, 104, made of glass or quartz.

A semispherical reflecting film 3a is provided with the internal mirror surface. Said reflecting film 3a is shaped similar to the reflector 3 in FIGS. 18A and 18B, defined by curves 3'.

The internal mirror surface of the reflecting film 3a is ideally a completely reflecting surface. However, since the reflecting surface is positioned close to light emitting part based on the arc discharge between the electrodes 104, and also since the light emitting part in fact has a finite size, the internal mirror surface of the reflecting film 3a may have certain diffusing character, and thus obtained diffused light beam can be regarded as a secondary light source present in the vicinity of the light emitting part. For this reason the reflecting film 3a may also be composed of a ceramic material, having a white surface of low absorption.

The reflecting film 3a may also be formed by a single-layered or multi-layered film of heat-resistant metal, capable of absorbing ultraviolet or infrared light. Such film reflects the visible light from the light source 1 but absorbes the non-visible light, thereby generating heat and serving to maintain the temperature.

The metal halide lamp is often provided with a light absorbing member on the bulb surface for maintaining the temperature of the bulb and thereby stabilizing the discharge, and the above-mentioned reflecting film 3a also serves for such function.

Figure 22:
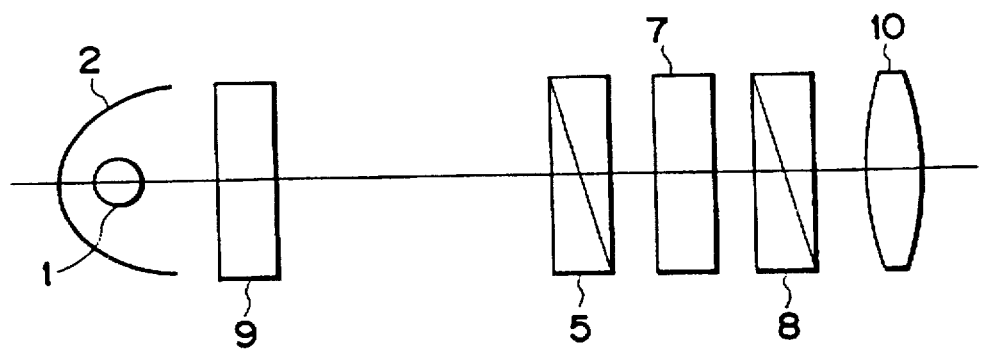
FIG. 22 is a schematic view of another embodiment of the projector of the present invention.

FIG. 22 is a schematic view of a projector employing the illuminating optical system of the present invention. The illuminating optical system of the present invention is composed of a light source 1 such as a halogen lamp or a metal halide lamp; an unrepresented reflector 3 positioned close to the light source 1 or a reflecting film 3a; and a reflector 2 for reflecting the light emitted from the light source 1. There are also provided a heat cut-off filter 9 for absorbing or reflecting the thermal radiation of the light beam entering directly from the light source 1 or by way of the reflector 2; a polarizing plate 5 for converting the light beam, after the elimination of the thermal radiation, into a linearly polarized light; an LCD 7 for modulating said linearly polarized light according to an image signal; a polarizing plate 8 for transmitting a component of the transmitting axis out of thus modulated linearly polarized light; and a projection lens 10 for magnified projection of thus transmitted linearly polarized light onto an unrepresented screen.

The present invention is not limited to the foregoing embodiments but is subject to various modifications within the scope of the present invention. The light source is not limited to the metal halide lamp but a xenon lamp or a halogen lamp may be employed for this purpose.

In case of color display with the projector, there is generally employed a configuration, as in other embodiments, of providing a color separation optical system, between the illuminating optical system and the LCD's, in order to separate the illuminating light into red, green and blue lights, and illuminating the LCD's provided respectively for these colors with these colored lights. Said color separation optical system may be composed of dichroic mirrors or dichroic prisms. A color synthesizing optical system may be provided between the plural LCD's and the projection lens, but it is also possible to project the R, G and B colors by projection lenses respectively corresponding to the LCD'S.

In the embodiments shown in FIGS. 15 to 22, a substantially parallel light beam is obtained by the rotationally symmetrical parabolic reflector, but such substantially parallel light beam may also be obtained by the combination of a rotationally symmetrical elliptical reflector and a lens. Said lens can be a convex lens or a concave lens, and the convex lens is to be positioned at the side of LCD, with respect to the two focal points of the rotational elliptical surface, while the concave lens is to be positioned between said two focal points. There may also be employed a Fresnel lens. The light source is generally positioned at a focal point, farther from the LCD, of two focal points.

A convex lens may be provided in the vicinity of the LCD in order that the illuminating light can pass the projection lens 10 without being eclipsed by the pupil thereof.

The LCD illuminated by the illuminating optical system is generally provided, in front and behind thereof, with polarizing plates called polarizer and analyzer, but such polarizing plate may be replaced by a polarizing beam splitter or a polarizing converter system as disclosed in Japanese Patent Application Laid-open No. 3-191318.

If the reflector 3 is completely spherical in the embodiments shown in FIGS. 15 to 22, the near-axis light emitted from the light source 1 is reflected in a near-axis portion of the reflector 3, then transmitted by the light source 1 and again reflected in the vicinity of the bottom portion 2' of the reflector 2, but such portion of light may not become effective because such bottom portion 2' lacks the reflecting power, or because such portion of light hits the member 1, or because it may again hit the reflector 3 even if it is successfully reflected by the reflector 2.

This drawback can be prevented by (1) displacing the center of curve of the reflector 3 from the light source 1, or (2) forming the reflector 3 aspherically. The method (2) is effective by varying the near-axis curvature.

As explained in the foregoing, the present invention can provide following effects.

The illuminating optical system of the present invention can greatly improve the rate of light utilization, since the light emitted from the light source lamp and directly proceeding to the exit without reflection on the elliptical reflector, namely the light not concentrated on the second focal point, is reflected by the circular reflector and is concentrated on said second focal point after passing the vicinity of the light source lamp.

Also the illuminating optical system of the present invention provides the illuminating light through an aperture formed in the flat mirror for reflecting the emerging light, so that the illuminating light can be obtained only in the required area by forming said aperture corresponding to the area to be illuminated, and the loss of light can be reduced.

The emerging light reflected by said flat mirror is again directed to said flat mirror after reflection on the parabolic or elliptical reflector and is released as the illuminating light through said aperture. Consequently most of the light from the light source can be utilized for illumination. Thus the light loss in the apparatus can be reduced to avoid the heat generation therein, so that the cooling means can be dispensed with or simplified. Consequently the apparatus can be made compacter with a lower cost.

Also the illuminating optical system of the present invention is advantageous in cost, as it can be used for plural different areas to be illuminated, without replacing the flat mirror. Particularly in case the aperture is formed by the combination of plural flat mirrors, the shape of said aperture can be varied by mutually displacing said plural flat mirrors and can be flexibly fitted to the objects of different shapes.

Furthermore, the illuminating optical system of the present invention shown in FIGS. 15 to 22 can further improve the efficiency of light utilization, since the number of reflections on the reflector and the sub reflector can be maintained at two at maximum. A further improvement in the illuminating efficiency can be attained because the illumination on the unnecessary area can be avoided by defining the shape of the sub reflector according to the shape of the object.

Also the projector of the present invention can utilize almost all of the light beam emitted from the light source lamp of the illuminating optical system for illumination of the image forming means. Consequently the projected image can be improved in luminance, and the ghost, flare etc. generated by the unutilized light can be avoided. Thus clearer image display is rendered possible.

What is claimed is:

1. An illuminating optical system comprising:
   an elliptical reflector for reflecting the light from a light source, positioned at a focal point thereof, toward an area to be illuminated;
   an optical element for converting the light beam, from said elliptical reflector, into a substantially parallel light beam; and
   a flat mirror having an aperture of a cross section different from that of the light beam coming by way of said optical element, said mirror being positioned substantially perpendicularly to the optical axis of the light beam from said optical element.

2. An illuminating optical system comprising:
   a light source;
   a reflector having its center position behind said light source and also having an aperture larger than an area to be illuminated; and
   returning means for returning the light, which emerges from said light source and proceeds by way of said reflector to the outside of said area to be illuminated, to the vicinity of said light source;
   wherein said returning means is positioned at the side of said light source, with respect to said aperture; and wherein said returning means is composed of a mirror provided on the surface of a light emitting bulb of said light source.

3. An illuminating optical system comprising:
   a light source;
   a reflector having its center position behind said light source and also having an aperture larger than an area to be illuminated; and
   returning means for returning the light, which emerges from said light source and proceeds by way of said reflector to the outside of said area to be illuminated, to the vicinity of said light source;
   wherein said returning means is positioned at the side of said light source, with respect to said aperture; and wherein said returning means is composed of a diffusing surface, provided on the surface of a light emitting bulb of said light source.

4. An illuminating optical system comprising:
   a light source;
   a reflector behind said light source; and
   returning means for returning the light, which emerges from said light source to the vicinity of said light source;
   wherein said returning means is composed of a mirror provided on a front surface of said light source.

5. An illuminating optical system comprising:
   a light source;
   a reflector behind said light source; and
   returning means for returning the light, which emerges from said light source and proceeds to the outside of said area to be illuminated, to the vicinity of said light source;
   wherein said returning means is composed of a mirror provided on a front surface of said light source.

6. An illuminating optical system comprising:
   a light source;
   a reflector behind said light source; and
   returning means for returning the light, which emerges from said light source to the vicinity of said light source;
   wherein said returning means is composed of a diffusing surface provided on a front surface of said light source.

7. An illuminating optical system comprising:
   a light source;
   a reflector behind said light source; and
   returning means for returning the light, which emerges from said light sources and proceeds to the outside of said area to be illuminated, to the vicinity of said light source;
   wherein said returning means is composed of a diffusing surface provided on a front surface of said light source.

* * * * *